US005831468A

United States Patent [19]

Kimura

[11] Patent Number: 5,831,468

[45] **Date of Patent: *Nov. 3, 1998**

[54] MULTIPLIER CORE CIRCUIT USING QUADRITAIL CELL FOR LOW-VOLTAGE OPERATION ON A SEMICONDUCTOR INTEGRATED CIRCUIT DEVICE

[75] Inventor: Katsuji Kimura, Tokyo, Japan

[73] Assignee: NEC Corporation, Tokyo, Japan

[ * ] Notice: The term of this patent shall not extend beyond the expiration date of Pat. No. 5,581,210.

[21] Appl. No.: 566,439

[22] Filed: Nov. 30, 1995

[30] Foreign Application Priority Data

Nov. 30, 1994 [JP] Japan .................................... 6-296620
Nov. 30, 1994 [JP] Japan .................................... 6-296621

[51] Int. Cl.[6] .......................................... G06F 7/44

[52] U.S. Cl. .......................... 327/359; 327/356; 327/563; 455/333

[58] Field of Search .................................... 327/355, 356, 327/359, 563; 330/252, 253; 455/326, 330, 333

[56] References Cited

U.S. PATENT DOCUMENTS

| | | | |
|---|---|---|---|
| 4,388,540 | 6/1983 | Schreurs | 327/356 |
| 5,107,150 | 4/1992 | Kimura | 327/349 |
| 5,151,624 | 9/1992 | Stegherr et al. | 327/356 |
| 5,187,682 | 2/1993 | Kimura | 364/841 |
| 5,438,296 | 8/1995 | Kimura | 327/356 |
| 5,523,717 | 6/1996 | Kimura | 330/252 |
| 5,552,734 | 9/1996 | Kimura | 327/356 |
| 5,576,653 | 11/1996 | Kimura | 327/356 |
| 5,578,965 | 11/1996 | Kimura | 330/254 |
| 5,581,210 | 12/1996 | Kimura | 327/355 |

FOREIGN PATENT DOCUMENTS

| | | |
|---|---|---|
| 0 603 829 | 6/1994 | European Pat. Off. . |
| 2 290 398 | 12/1995 | United Kingdom . |

OTHER PUBLICATIONS

K. Bult et al., "A CMOS Four–Quadrant Analog Multiplier", *IEEE Journal of Solid–State Circuits*, vol. SC–21, No. 3, Jun. 1986, pp. 430–435.

Z. Wang, "Novel Linearisation Technique for Implementing Large–Signal MOS Tunable Transconductor", *Electronics Letters*, vol. 26, No. 2, Jan. 18, 1990, pp. 138–139.

P. Wu et al., "Tunable Operational Transconductance Amplifier With Extremely High Linearity Over Very Large Input Range", *Electronics Letters*, vol. 27, No. 14, Jul. 4, 1991, pp. 1254–1255.

*Primary Examiner*—Timothy P. Callahan
*Assistant Examiner*—Kenneth B. Wells
*Attorney, Agent, or Firm*—Sughrue, Mion, Zinn, Macpeak & Seas, PLLC

[57] ABSTRACT

A multiplier core circuit using four transistors, in which a novel input voltage combination is adopted. This circuit contains first, second, third and fourth bipolar transistors or field-effect transistors whose emitters or sources are coupled together. Collectors or drains of the first and second transistors are coupled together to form an output end and collectors or drains of the third and fourth transistors are coupled together to form the other output end. An output signal of the circuit is differentially taken out from the output ends. The first to fourth transistors are applied with first to fourth voltages at their base or gate. The first, second, third and fourth voltages are $[-V_x+(½)V_y]$, $(V_x+V_y)$, $(-V_x+V_y)$ and $[V_x+(½)V_y]$, respectively. These four voltages may be $(V_x-V_y)$, $2V_x$, $V_x$ and $(2V_x-V_y)$, respectively. If a, b and c are positive constants, these four voltages may be expressed as $(aV_x+bV_y)$, $[(a-c)V_x+(b-1/c)V_y]$, $[(a-c)V_x+bV_y]$, and $[aV_x+(b-1/c)V_y]$, respectively.

27 Claims, 24 Drawing Sheets

MULTIPLIER CORE CIRCUIT USING QUADRITAIL CELL FOR LOW-VOLTAGE OPERATION ON A SEMICONDUCTOR INTEGRATED CIRCUIT DEVICE

BACKGROUND OF THE INVENTION

1. Field of the Invention

The present invention relates to a multiplier core circuit used for multiplying two analog signals and more particularly, to a multiplier core circuit containing four bipolar transistors or four Field-Effect Transistors (FETs) applied with four input voltages, which is capable of low-voltage operation on a semiconductor integrated circuit device.

2. Description of the Prior Art

An analog multiplier multiplying two analog signal values constitutes a functional circuit block essential for analog signal applications.

A conventional multiplier core circuit including two squarers have been known, in which the square-law characteristic of metal-oxide-semiconductor FETs (MOSFETs) is utilized. Specifically, the linear behavior of the multiplier of this type is typically defined by the following algebraic equation (1), where two parameters a and b indicate input voltages.

$$(a+b)^2-(a-b)^2=4ab \tag{1}$$

It is seen from the equation (1) that the linear function is defined by the difference between the square of (a+b) and the square of (a−b). The technique utilizing the equation (1) is well known as the "quarter-square technique".

Assuming that the channel-length modulation and the body effect are ignored, the drain current $I_{Di}$ of the i-th MOSFET operating in the saturation region is expressed by the following equations (2a) and (2b), where β is the transconductance parameter, $V_{GSi}$ are the gate-to-source voltages of the i-th MOSFETs, and $V_{TH}$ is the threshold voltage thereof.

$$I_{Di}=\beta(V_{GSi}-V_{TH})^2 \quad (V_{GSi}\geqq V_{TH}) \tag{2a}$$

$$I_{Di}=0 \quad (V_{GSi}\leqq V_{TH}) \tag{2b}$$

The transconductance parameter β is expressed as $$\beta=\mu(C_{ox}/2)\ (W/L)$$

where $\mu$ is the effective surface carrier mobility, $C_{ox}$ is a gate-oxide capacity per unit area, and W and L are a gate width and a gate length of each MOSFET, respectively.

As seen from the equations (2a) and (2b), the drain current $I_{Di}$ contains the threshold voltage $V_{TH}$ as a parameter and therefore, an MOS multiplier configurated to correspond to the equation (1) is affected by the threshold voltage $V_{TH}$.

To remove the effect by the threshold voltage $V_{TH}$, the following linear algebraic equation (3) and (4) are defined, where a surplus or extra parameter c is additionally contained.

$$(a+b+c)^2-(a-b+c)^2+(a+b-c)^2-(a-b-c)^2=8ab \tag{3}$$

$$(a+c)^2-(a-c)^2+(a+b-c)^2-(a-b+c)^2=4ab \tag{4}$$

It is seen from the equations (3) and (4) that these linear functions may be defined by four terms each containing the square of two or three of the parameters a, b and c. A multiplier corresponding to the equation (3) or (4) can be realized by using four MOSFETs.

FIG. 1 shows a first example of a conventional MOS multiplier core circuit, which has a typical or basic configuration and floating inputs. This conventional multiplier core circuit has a quadritail cell formed of first to fourth n-channel MOSFETs M111, M112, M113 and M114 and a constant current source CS110 (current: $I_0$) for driving the quadritail cell. The MOSFETs M111, M112, M113 and M114 have the same transconductance parameter β.

Sources of the first to fourth MOSFETs M111, M112, M113 and M114 are coupled together. The constant current source CS110 is connected to the coupled sources and the ground, respectively. In other words, these transistors M111, M112, M113 and M114 are grounded through the current source CS110.

Gates of the first to fourth MOSFETs M111, M112, M113 and M114 are applied with four input voltages $V_1$, $V_2$, $V_3$ and $V_4$, respectively.

Drains of the first and second MOSFETs M111 and M112 are coupled together. An output current $I_L$, which is equal to the sum of drain currents of the first and second MOSFETs, M111 and M112, is taken out from the coupled drains of the MOSFETs M111 and M112.

Drains of the third and fourth MOSFETs M113 and M114 are coupled together. Another output current $I_R$, which is equal to the sum of drain currents of the third and fourth MOSFETs, M113 and M114, is taken out from the coupled drains of the MOSFETs M113 and M114.

A differential output current ΔI of the multiplier core circuit is defined as a difference of the currents $I_L$ and $I_R$, i.e., $\Delta I=I_L-I_R$.

If the transistors M111, M112, M113 and M114 operate outside the cut-off region, their drain currents vary according to the square-law characteristic. Therefore, the circuit shown in FIG. 1 is capable of an operation corresponding to the above equation (3) or (4).

FIG. 2 shows a second example of the conventional MOS multiplier core circuits, which has a source-grounded configuration and floating inputs.

The conventional multiplier core circuit of FIG. 2 is the same in configuration as the first example of FIG. 1 except that no current source is provided and the sources of the first to fourth transistors M111, M112, M113 and M114 are directly grounded. Therefore, no explanation is shown here by adding the same reference numerals as those in the first example to the corresponding elements for the sake of simplification of description.

The circuit shown in FIG. 2 also is capable of an operation corresponding to the above equation (3) or (4).

With the conventional multiplier core circuits of FIGS. 1 and 2, the differential output current ΔI is expressed as the following equation (5).

$$\begin{aligned}\frac{\Delta I}{\beta} &= (V_1+V_R-V_S-V_{TH})^2+(V_2+V_R-V_S-V_{TH})^2-\\ &\quad (V_3+V_R-V_S-V_{TH})^2-(V_4+V_R-V_S-V_{TH})^2\\ &= V_1^2+V_2^2-V_3^2-V_4^2+2c(V_1+V_2-V_3-V_4)\end{aligned} \tag{5}$$

In the equation (5), $V_R$ is a dc voltage contained in the input voltages $V_1$, $V_2$, $V_3$ and $V_4$, and $V_S$ is a common source voltage. Also, $c=V_R-V_{S-VTH}$ is established. $V_S$ is zero in the circuit of FIG. 2.

With the conventional multiplier core circuit of FIG. 1, the common tail current of the quadritail cell is $I_0$ and therefore, the following relationship (6) is established.

$$I_{D1}+I_{D2}+I_{D3}+I_{D4}=I_0 \tag{6}$$

The following relationship (7) is established when the parameter c is cancelled.

$$V_1+V_2-V_3-V_4=0 \tag{7}$$

Accordingly, the equation (5) can be expressed as follows:

$$\frac{\Delta I}{\beta} = V_1^2+V_2^2-V_3^2-V_4^2 = (V_1-V_4)(V_1+V_4-V_2-V_3) \tag{8}$$

Conventionally, some multiplier core circuits in which the input voltages $V_1$, $V_2$, $V_3$ and $V_4$ are adaptively set to linearize the differential output current ΔI have been developed. A first type of the input voltage combination was proposed by Bult and Wallinga. A second type thereof was proposed by Wang and Schaumann, which was originally discovered by Bult.

The multiplier core circuit proposed by Bult and Wallinga was disclosed in IEEE Journal of Solid-State Circuits, Vol. SC-21, No. 3, pp. 430–435, June 1986. The multiplier core circuit originally proposed by Bult was disclosed in his Ph. D. dissertation. The multiplier core circuit proposed by Wang was disclosed in IEEE Electronics Letters, 18th Jan., 1990, Vol. 26, No. 9. The multiplier core circuit reproposed by Wu and Schaumann was disclosed in IEEE Electronics Letters, 4th Jul., 1991, Vol. 27, No. 14.

The input voltage combination of the first type is shown by the following equations (9-1), (9-2), (9-3) and (9-4).

$$V_1=\frac{(V_x+V_y)}{2} \tag{9-1}$$

$$V_2=-\frac{(V_x+V_y)}{2} \tag{9-2}$$

$$V_3=-\frac{(V_x-V_y)}{2} \tag{9-3}$$

$$V_4=\frac{(V_x-V_y)}{2} \tag{9-4}$$

The input voltage combination of the second type is shown by the following equations (10-1), (10-2), (10-3) and (10-4)

$$V_1=\frac{V_x}{2} \tag{10-1}$$

$$V_2=-\frac{V_x}{2}+V_y \tag{10-2}$$

$$V_3=\frac{V_x}{2}-V_y \tag{10-3}$$

$$V_4=-\frac{V_x}{2} \tag{10-4}$$

FIGS. 3 and 4 show third and fourth examples of the conventional MOS multiplier core circuits of the first type, both of which were developed by Bult and Wallinga. FIG. 5 shows a fifth example of the conventional MOS multiplier core circuits of the second type, which was reproposed by Wang. FIG. 6 shows a sixth example of the conventional MOS multiplier core circuits of the second type, which was developed by Wu and Schaumann.

The conventional multiplier core circuit of FIG. 3 is the same in configuration as that of FIG. 1 except for a voltage source VS110 (voltage: $V_R$) that is additionally provided between a reference point and the ground and for the input voltage combination. In this circuit, the input voltages $V_1$, $V_2$, $V_3$ and $V_4$ applied into the first to fourth MOSFETs M111, M112, M113 and M114 are decided according to the above equations (9-1), (9-2), (9-3) and (9-4), respectively. The dc voltage $V_R$ is adjusted in order to operate the MOSFETs M111, M112, M113 and M114 outside their cut-off region.

The conventional multiplier core circuit of FIG. 4 is the same in configuration as that of FIG. 2 except for a voltage source VS110 (voltage: $V_R$) is additionally provided between a reference point and the ground and for the input voltage combination. In this circuit also, the input voltages $V_1$, $V_2$, $V_3$ and $V_4$ applied into the first to fourth MOSFETs M111, M112, M113 and M114 are decided according to the above equations (9-1), (9-2), (9-3) and (9-4), respectively. The dc voltage $V_R$ is adjusted in order to operate the MOSFETs M111, M112, M113 and M114 outside their cut-off region.

With the conventional multiplier core circuits in FIGS. 3 and 4, since the combination of the input voltages ($V_1$, $V_2$, $V_3$, $V_4$) is in the form of (a+b, −a−b, −a+b, a−b), the input voltages $V_1$, $V_2$, $V_3$ and $V_4$ satisfy the above equation (3). In this case, $V_1-V_4=2b$ and $V_1+V_4-V_2-V_3=4a$ are established from the equation (8), because $V_1+V_4=-V_2-V_3=2a$. As a result, $(\Delta I/\beta)=8ab$ is obtained.

Thus, the parameter c can be deleted by adapting the input voltage combination of the first type for the two input voltages $V_x$ and $V_y$ to be multiplied, resulting in a linear multiplication characteristic.

The conventional multiplier core circuit of FIG. 5 of the second type is the same in configuration as that of FIG. 3 except for the input voltage combination. In this circuit, the input voltages $V_1$, $V_2$, $V_3$ and $V_4$ applied into the first to fourth MOSFETs M111, M112, M113 and M114 are decided according to the above equations (10-1), (10-2), (10-3) and (10-4), respectively. The dc voltage $V_R$ is adjusted in order to operate the MOSFETs M111, M112, M113 and M114 outside their cut-off region.

The conventional multiplier core circuit of FIG. 6 of the second type is the same in configuration as that of FIG. 4 except for the input voltage combination. In this circuit also, the input voltages $V_1$, $V_2$, $V_3$ and $V_4$ applied into the first to fourth MOSFETs M111, M112, M113 and M114 are decided according to the above equations (10-1), (10-2), (10-3) and (10-4), respectively.

With the conventional multiplier core circuits in FIGS. 5 and 6, since the combination of the input voltages ($V_1$, $V_2$, $V_3$, $V_4$) is in the form of (a, −a−b, a−b, −a), the input voltages $V_1$, $V_2$, $V_3$ and $V_4$ satisfy the above equation (4). In this case, $V_1-V_4=2a$ and $V_1+V_4-V_2-V_3=2b$ are established from the equation (8), because $V_1+V_4=-V_2-V_3=2a$. As a result, $(\Delta I/\beta)=4ab$ is obtained.

Thus, the parameter c can be deleted by adapting the input voltage combination of the second type for the two input voltages $V_x$ and $V_y$ to be multiplied, resulting in a linear multiplication characteristic.

With the conventional multiplier core circuits of FIGS. 2, 4 and 6, in which the sources of the MOSFETs M111, M112, M113 and M114 are directly grounded, a maximum current of the circuit is not limited by the current source CS110 and is limited by only internal resistances of the MOSFETs M111, M112, M113 and M114 or the like.

On the other hand, with the conventional multiplier core circuits of FIGS. 1, 3 and 5 in which the MOSFETs M111, M112, M113 and M114 are driven by the current source CS110, the current of the circuit is decided by the tail current $I_0$ supplied by the current source CS110 and therefore, the input voltage range is restricted by the tail current $I_0$.

When these conventional multiplier core circuits are provided on large-scale integrated circuits (LSIs), the floating inputs and constant current driving configurations are preferred, because any fluctuation in multiplication characteristic that will occur during their fabrication processes can be avoided.

Next, conventional bipolar multiplier core circuits are described.

FIG. 7 shows a first example of conventional bipolar multiplier core circuit, which has a typical or basic configuration and floating inputs. This conventional multiplier core circuit of FIG. 7 has a quadritail cell formed of first to fourth npn-type bipolar transistors Q21, Q22, Q23 and Q24 and a constant current source CS20 (current: $I_0$) for driving the quadritail cell. The transistors Q21, Q22, Q23 and Q24 have the same emitter area.

Emitters of the transistors Q21, Q22, Q23 and Q24 are coupled together. The constant current source CS20 is connected to the coupled emitters and the ground, respectively. In other words, these transistors Q21, Q22, Q23 and Q24 are grounded through the current source CS20.

Bases of the first to fourth transistors Q21, Q22, Q23 and Q24 are applied with four input voltages $V_1$, $V_2$, $V_3$ and $V_4$, respectively.

Collectors of the first and second transistors Q21 and Q22 are coupled together. An output current $I^+$, which is equal to the sum of collector currents of the first and second transistors Q21 and Q22, is taken out from the coupled collectors of the transistors Q21 and Q22.

Collectors of the third and fourth transistors Q23 and Q24 are coupled together. Another output current $I^-$, which is equal to the sum of collector currents of the third and fourth transistors Q23 and Q24, is taken out from the coupled collectors of the transistors Q23 and Q24.

A differential output current $\Delta I$ of the multiplier core circuit is defined as a difference of the currents $I^+$ and $I^-$, i.e., $\Delta I = I^+ - I^-$.

In the multiplier core circuit of FIG. 7, if the relationship between the collector current and the base-emitter voltage varies dependent on the exponential-law characteristic, the collector current $I_{ci}$ of the i-th transistor is expressed as the following equation (11), where $I_s$ is the saturation current, $V_{BEi}$ is the base-emitter voltage of each transistor, and $V_T$ is the thermal voltage.

$$I_{Ci} = I_S\left\{\exp\left(\frac{V_{BEi}}{V_T}\right) - 1\right\} \tag{11}$$

The thermal voltage $V_T$ is expressed as $V_T$=kT/q where k is Boltzmann's constant, T is absolute temperature in degrees Kelvin and q is the charge of an electron.

In the equation (11), if $V_{BE}$ is about 600 mV which corresponds to the normal operation region of the transistor, the exponential term "exp ($V_{BE}/V_T$)" has a value in the order of $e^{10}$, and therefore, the term "−1" can be neglected. As a result, the equation (11) can be approximated as the following equation (12).

$$I_{Ci} = I_S\exp\left(\frac{V_{BEi}}{V_T}\right) \tag{12}$$

Then, assuming that all the transistors Q21, Q22, Q23 and Q24 are matched in characteristic, the collector currents of the transistors Q21, Q22, Q23 and Q24 driven by the tail current $I_0$ are expressed as the following equations (13), (14), (15) and (16), respectively, where $V_R$ is a dc voltage contained in the input voltages $V_1$, $V_2$, $V_3$ and $V_4$, and $V_E$ is the common emitter voltage.

$$I_{C1} = I_S\exp\left(\frac{V_1 + V_R - V_E}{V_T}\right) \tag{13}$$

$$I_{C2} = I_S\exp\left(\frac{V_2 + V_R - V_E}{V_T}\right) \tag{14}$$

$$I_{C3} = I_S\exp\left(\frac{V_3 + V_R - V_E}{V_T}\right) \tag{15}$$

$$I_{C4} = I_S\exp\left(\frac{V_4 + V_R - V_E}{V_T}\right) \tag{16}$$

Since the quadritail cell in FIG. 7 is driven by the common tail current $I_0$, the following equation (17) is established additionally, where $\alpha_F$ is the dc common-base current gain factor.

$$I_{C1}+I_{C2}+I_{C3}+I_{C4}=\alpha_F I_0 \tag{17}$$

Solving the equations (13), (14), (15), (16) and (17) provides the following equation (18).

$$I_S\exp\left(\frac{V_R - V_E}{V_T}\right) = \frac{\alpha_F I_0}{\left\{\exp\left(\frac{V_1}{V_T}\right) + \exp\left(\frac{V_2}{V_T}\right) + \exp\left(\frac{V_3}{V_T}\right) + \exp\left(\frac{V_4}{V_T}\right)\right\}} \tag{18}$$

The differential output current $\Delta I$ of the cell is expressed as the following equation (19)

$$\Delta I = \frac{\alpha_F I_0\left\{\exp\left(\frac{V_1}{V_T}\right) - \exp\left(\frac{V_2}{V_T}\right) - \exp\left(\frac{V_3}{V_T}\right) + \exp\left(\frac{V_4}{V_T}\right)\right\}}{\left\{\exp\left(\frac{V_1}{V_T}\right) + \exp\left(\frac{V_2}{V_T}\right) + \exp\left(\frac{V_3}{V_T}\right) + \exp\left(\frac{V_4}{V_T}\right)\right\}} \tag{19}$$

It is seen from the equation (19) that the input voltages $V_1$, $V_2$, $V_3$ and $V_4$ need to be adaptively decided in order to produce the differential output current $\Delta I$.

FIG. 8 shows a second example of the conventional bipolar multiplier core circuits of the first type, in which the input voltages $V_1$, $V_2$, $V_3$ and $V_4$ are adaptively set to linearize the differential output current $\Delta I$. This circuit is obtained by replacing the MOSFETs by bipolar transistors in the circuit of FIG. 3 proposed by Bult and Wallinga.

The conventional multiplier core circuit of FIG. 8 is the same in configuration as that of FIG. 7 except for the input voltage combination.

A base of the transistor Q21 is applied with an input voltage (½) ($V_x+V_y$) with regard to a reference point. A base of the transistor Q22 is applied with an input voltage (½)($V_x-V_y$) with regard to the reference point. A base of the transistor Q23 is applied with an input voltage (−½) ($V_x-V_y$) with regard to the reference point. A base of the transistor Q24 is applied with an input voltage (−½) ($V_x-V_y$) with regard to the reference point.

In the conventional multiplier core circuit of FIG. 8, $V_1$=(½) ($V_x+V_y$), $V_2$=−(½) ($V_x+V_y$), $V_3$=−(½) ($V_x-V_y$), and $V_4=(½)(V_x-V_y)$, and therefore, the differential output current ΔI is expressed as the following equation (20) from the equation (19).

$$\Delta I = \alpha_F I_0 \tanh\left(\frac{V_x}{2V_T}\right)\tanh\left(\frac{V_y}{2V_T}\right) \quad (20)$$

The right-hand side of the equation (20) multiplied by $\alpha_F$ is equal to the differential output current of the well-known Gilbert multiplier cell.

An obtainable value of $\alpha_F$ through the typical bipolar processes is in the range from 0.98 to 0.99, which is extremely near 1. Therefore, it is seen from the equation (20) that the conventional multiplier core circuit of FIG. 8 has the transfer characteristic approximately equal to that of the Gilbert multiplier cell.

Also, since the conventional multiplier core circuit of FIG. 8 does not contain the transistors stacked as in the Gilbert multiplier cell, the circuit of FIG. 8 can operate at a lower voltage than the Gilbert's one.

In addition, if the coupled emitters of the transistors Q21, Q22, Q23 and Q24 are directly grounded in the circuit of FIG. 8 by removing the current source CS20, the differential output current ΔI is given by the following equation (21).

$$\Delta I = 4I_0 \sinh\left(\frac{V_x}{2V_T}\right)\sinh\left(\frac{V_y}{2V_T}\right) \quad (21)$$

where $I_0=I_S \exp(V_R/V_T)$.

Accordingly, when the transistors Q21, Q22, Q23 and Q24 are directly grounded as in the conventional MOS multiplier core circuit of FIG. 2, no multiplier characteristic can be obtained.

FIG. 9 shows a third example of the conventional bipolar multiplier core circuits of the second type, in which the input voltages $V_1$, $V_2$, $V_3$ and $V_4$ are adaptively set. This circuit is obtained by replacing the MOSFETs by bipolar transistors in the circuit of FIG. 5 proposed by Wang.

The circuit of FIG. 9 is the same in configuration as that of FIG. 8 except for the input voltage combination. In the circuit of FIG. 9, $V_1=(½)V_x$, $V_2=(-½)V_x-V_y$, $V_3=(½)V_x-V_y$, and $V_4=-(½)V_x$, and therefore, the differential output current ΔI is expressed as the following equation (22) from the equation (19).

$$\Delta I = \alpha_F I_0 \tanh\left(\frac{V_x}{2V_T}\right)\tanh\left(\frac{V_y}{2V_T}\right) \quad (22)$$

The equation (22) is the same as the equation (20). Similar to the circuit of FIG. 8, the right-hand side of the equation (20) multiplied by $\alpha_F$ is equal to the differential output current of the well-known Gilbert multiplier cell. This means that the circuit of FIG. 9 also provides a multiplier characteristic.

If the coupled emitters of the transistors Q21, Q22, Q23 and Q24 are directly grounded in the circuit of FIG. 9 by removing the current source CS20, the differential output current ΔI is given by the following equation (23).

$$\Delta I = 4I_0 \exp\left(-\frac{V_x}{2V_T}\right)\sinh\left(\frac{V_y}{2V_T}\right)\sinh\left(\frac{V_x}{2V_T}\right) \quad (23)$$

Accordingly, also in this case, no multiplier characteristic can be obtained.

Recently, LSIs have been made finer and finer and as a result, their supply voltages have been decreasing from 5 V to 3.3 or 3 V or less. Under such a circumstance, circuits that can operate at a low voltage such as 3 V or less have been required to be developed. Also, the Complementary Metal-Oxide-Semiconductor (CMOS) technology has become recognized to be the optimum process technology for LSIs, so that analog multipliers and multiplier core circuits that can be realized on LSIs using the CMOS technology have been required.

The Gilbert multiplier cell cannot be operated at a low supply voltage because the number of stacked bipolar transistors is large.

On the other hand, the above conventional MOS multiplier core circuits of FIGS, 3, 4, 5 and 6 can operate at a low supply voltage such as 3 V. However, the input subcircuit for generating the combination of four input voltages $V_1$, $V_2$, $V_3$ and $V_4$ becomes rather large in scale, which leads to enlargement in circuit scale of the input subcircuit. As a result, a problem that the configuration of the multiplier itself becomes complex takes place.

SUMMARY OF THE INVENTION

Accordingly, an object of the present invention is to provide a multiplier core circuit that enables realization of the linear multiplier characteristic and low voltage operation by a novel input voltage combination.

The above object together with others not specifically mentioned will become clear to those skilled in the art from the following description.

A multiplier core circuit according to a first aspect of the present invention has first, second, third and fourth FETs whose sources are coupled together, and a current source for driving the first to fourth FETs by a common tail current.

Drains of the first and second FETs are coupled together. A first output is taken out from the coupled drains of the first and second FETs. Drains of the third and fourth FETs are coupled together. A second output is taken out from the coupled drains of the third and fourth FETs.

When a first input voltage and a second input voltage to be multiplied are defined as $V_x$ and $V_y$, respectively,. a gate of the first FET is applied with $[-V_x+(½)V_y]$, a gate of the second FET is applied with $(V_x+V_y)$, a gate of the third FET is applied with $(-V_x+V_y)$, and a gate of the fourth FET is applied with $[V_x+(½)V_y]$.

An output of the multiplier core circuit is defined as a difference between the first output and the second output.

With the multiplier core circuit according to the first aspect, since the gates of the first, second, third and fourth FETs are applied with the voltages of $[-V_x+(½)V_y]$, $(V_x+V_y)$, $(-V_x+V_y)$, and $[V_x+(½)V_y]$, respectively, this multiplier core circuit has a novel input voltage combination for the first to fourth FETs. Accordingly, a linear multiplier characteristic and low supply-voltage operation can be realized independent of the threshold voltage.

Also, since the first to fourth FETs are driven by the common tail current, this circuit has floating inputs and a limiting multiplier characteristic. This circuit is preferable for LSI.

A multiplier core circuit according to a second aspect of the present invention is the same in configuration as that according to the first aspect except that no current source is provided and that the sources of the first, second, third and fourth FETs are directly grounded.

Also with the circuit of the second aspect, the same effects or advantages as those in the first aspect can be obtained. Because this circuit has the directly grounded sources of the first, second, third and fourth FETs, an advantage of wider input voltage ranges for $V_x$ and $V_y$ than that of the first aspect is additionally obtained.

A multiplier core circuit according to a third aspect of the present invention is the same in configuration as that according to the first aspect except that the first, second, third and fourth FETs are replaced by first, second, third and fourth bipolar transistors, respectively.

With the circuit of the third aspect, the same effects or advantages as those in the first aspect can be obtained.

A multiplier core circuit according to a fourth aspect of the present invention is the same in configuration as that according to the first aspect except for the input voltage combination.

With the circuit of the fourth aspect, a gate of the first FET is applied with $(V_x-V_y)$, a gate of the second FET is applied with $2V_x$, a gate of the third FET is applied with $V_x$, and a gate of the fourth FET is applied with $(2V_x-V_y)$. Therefore, the same effects or advantages as those in the first aspect can be obtained.

A multiplier core circuit according to a fifth aspect of the present invention is the same in configuration as that according to the fourth aspect except that no current source is provided and that the sources of the first, second, third and fourth FETs are directly grounded.

Also with the circuit of the fifth aspect, the same effects or advantages as those in the fourth aspect can be obtained. Because this circuit has the directly grounded sources of the first, second, third and fourth FETs, an advantage of wider input voltage ranges than that of the fourth aspect is additionally obtained.

A multiplier core circuit according to a sixth aspect of the present invention is the same in configuration as that according to the fourth aspect except that the first, second, third and fourth FETs are replaced by first, second, third and fourth bipolar transistors, respectively.

With the circuit of the sixth aspect, the same effects or advantages as those in the fourth aspect can be obtained.

A multiplier core circuit according to a seventh aspect of the present invention is the same in configuration as that according to the first aspect except for the input voltage combination.

A gate of the first FET is applied with $(aV_x+bV_y)$ a gate of the second FET is applied with $[(a-c)V_x+(b-1/c)V_y]$, a gate of the third FET is applied with $[(a-c)V_x+bV_y]$ and a gate of the fourth FET is applied with $[aV_x+(b-1/c)V_y]$, where a, b and c are positive integers.

A multiplier core circuit according to an eighth aspect of the present invention is the same in configuration as that according to the second aspect except for the input voltage combination. The input voltages to the first to fourth FETs are the same as those in the circuit according to the seventh aspect.

A multiplier core circuit according to a ninth aspect of the present invention is the same in configuration as that according to the third aspect except for the input voltage combination. The input voltages to the first to fourth bipolar transistors are the same as those in the circuit according to the seventh aspect.

With the circuits of the seventh, eighth and ninth aspects, the same effects or advantages as those in the first aspect can be obtained.

With the circuits of the seventh, eighth and ninth aspects, preferably, the relationships of $a \geqq c$ and $b \geqq 1/c$ are established. In this case, an advantage that the input voltages for the first to fourth FETs or bipolar transistors can be produced by a voltage divider made of at least one resistor.

With the multiplier core circuits according to the first, second, fourth, fifth, seventh and eighth aspects, any FET may be employed. However, MOSFETs are preferably employed.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described below referring to FIGS. 10 to 36.

First Embodiment

Figure 10:
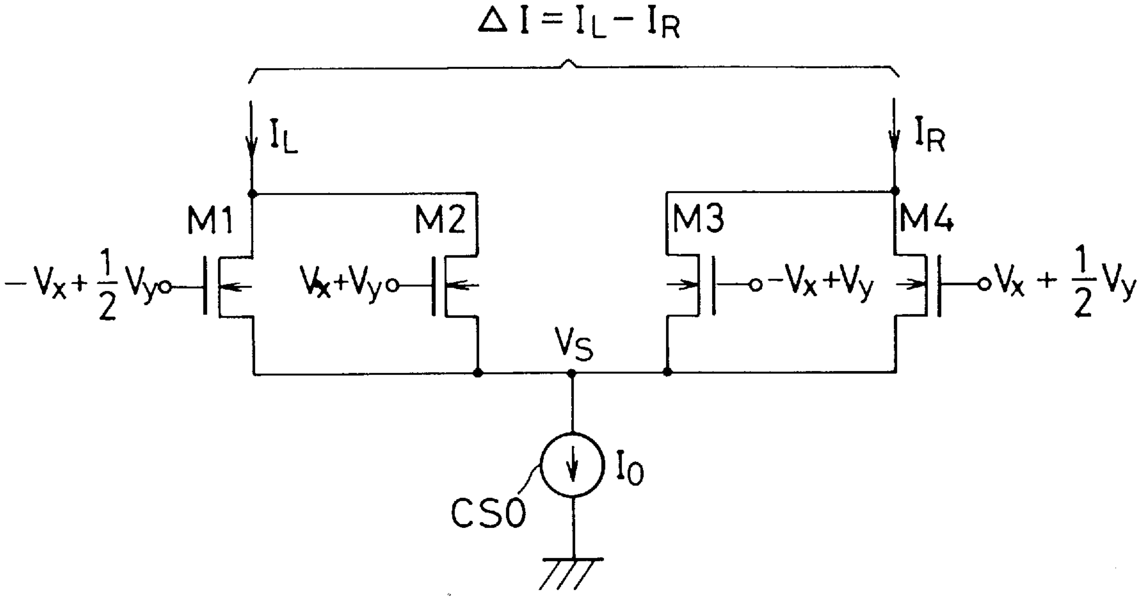
FIG. 10 is a circuit diagram showing a MOS multiplier core circuit according to a first embodiment of the present invention, which contains a quadritail cell.

FIG. 10 shows a four-quadrant multiplier core circuit according to a first embodiment of the present invention, which is composed of MOSFETs.

As shown in FIG. 10, this circuit has a quadritail cell formed of first to fourth n-channel MOSFETs M1, M2, M3 and M4 and a constant current source CS0 (current; $I_0$) for driving the quadritail cell. The MOSFETs M1, M2, M3 and M4 have the same transconductance parameter β.

Sources of the MOSFETs M1, M2, M3 and M4 are coupled together. The constant current source CS0 is connected to the coupled sources and the ground, respectively. In other words, these MOSFETs M1, M2, M3 and M4 are grounded through the current source CS0.

Drains of the first and second MOSFETs M1 and M2 are coupled together. An output current $I_L$, which is equal to the sum of the drain currents of the MOSFETs M1 and M2, is taken out from the coupled drains of the MOSFETs M1 and M2.

Drains of the third and fourth MOSFETs M3 and M4 are coupled together. Another output current $I_R$, which is equal to the sum of the drain currents of the MOSFETs M3 and M4, is taken out from the coupled drains of the MOSFETs M3 and M4.

A differential output current ΔI of the multiplier core circuit is defined as the difference of the currents $I_L$ and $I_R$, i.e., $\Delta I=I_L-I_R$.

When two input signal voltages to be multiplied are defined as $V_x$ and $V_y$, the following input voltages are applied to the gates of the respective MOSFETs M1, M2, M3 and M4 through an input subcircuit (not shown).

Specifically, a gate of the first MOSFET M1 is applied with a voltage $[-V_x+(½)V_y]$. A gate of the second MOSFET M2 is applied with a voltage $(V_x+V_y)$. A gate of the third MOSFET M3 is applied with a voltage $(-V_x+V_y)$. A gate of the fourth MOSFET M4 is applied with a voltage $[V_x+(½)V_y]$.

The following linear algebraic equation (24) including four squares can be defined, in which a surplus or extra parameter c is added.

$$\left(-a+\frac{b}{2}-c\right)^2+(a+b-c)^2-(-a+b-c)^2-\left(a+\frac{b}{2}-c\right)^2=2ab \tag{24}$$

In this case, the input voltage combination is expressed as follows.

$$V_1=-a+(½)b$$

$$V_2=a+b$$

$$V_3=-a+b$$

$$V_4=a+(½)b$$

If these four equations are substituted into the above equation (8), the following equations are obtained where $V_1+V_4=b$, and $V_2+V_3=2b$.

$$V_1-V_4=-2a$$

$$V_1+V_4-V_2-V_3=-b$$

As a result, $\Delta I/\beta=2ab$ can be obtained.

These relationships between the four voltages $V_1$, $V_2$, $V_3$ and $V_4$ applied to their gates. Accordingly, it is seen that a multiplier core circuit without the unnecessary parameter c can be realized using just such an input voltage combination.

Drain currents $I_{D1}$, $I_{D2}$, $I_{D3}$ and $I_{D4}$ of the MOSFETs M1, M2, M3 and M4 are expressed as the following equations (25), (26), (27) and (28), respectively, where $V_R$ is the dc voltage contained in the input signal voltages and $V_S$ is the common source voltage.

$$I_{D1}=\beta\left(-V_x+\frac{V_y}{2}+V_R-V_S-V_{TH}\right)^2 \tag{25}$$

$$I_{D2}=\beta(V_x+V_y+V_R-V_S-V_{TH})^2 \tag{26}$$

-continued $$I_{D3} = \beta(-V_x + V_y + V_R - V_S - V_{TH})^2 \quad (27)$$

$$I_{D4} = \beta\left(V_x + \frac{V_y}{2} + V_R - V_S - V_{TH}\right)^2 \quad (28)$$

The condition for the common tail current $I_0$ provides the following equation (29).

$$I_{D1}+I_{D2}+I_{D3}+I_{D4}=I_0 \quad (29)$$

As a result, the differential output current $\Delta I$ of the multiplier core circuit is expressed as the following equations (30a), (30b) and (30c).

$$\Delta I = I_L - I_R = (I_{D1} + I_{D2}) - (I_{D3} + I_{D4}) = 2\beta V_x V_y \quad (30a)$$

$$\left(V_x^2 + V_y^2 + |V_xV_y| \leqq \frac{I_0}{2\beta}\right)$$

$$\Delta I = I_L - I_R = (I_{D1} + I_{D2}) - (I_{D3} + I_{D4}) = \frac{4}{3}\beta V_x V_y - \frac{1}{9}\,\mathrm{sgn}(V_xV_y)\left\{3I_0 + \beta(|V_x| + |V_y|)^2 - 4\beta(|V_x| + |V_y|)\sqrt{\frac{3I_0}{\beta} - 2(|V_x| + |V_y|)^2 + 6|V_x|\,|V_y|}\right\} \quad (30b)$$

$$\left(V_x^2 + V_y^2 + |V_xV_y| \geqq \frac{I_0}{2\beta} \geqq V_x^2 + V_y^2 - \frac{5}{3}|V_xV_y|\right)$$

$$\Delta I = I_L - I_R = (I_{D1} + I_{D2}) - (I_{D5} + I_{D4}) = \left(\beta V_y\sqrt{\frac{I_0}{\beta} - V_y^2}\right)\mathrm{sgn}(V_x) \quad (30c)$$

$$\left(V_x^2 + V_y^2 - \frac{5}{3}|V_xV_y| \geqq \frac{I_0}{2\beta}\right)$$

Figure 1:
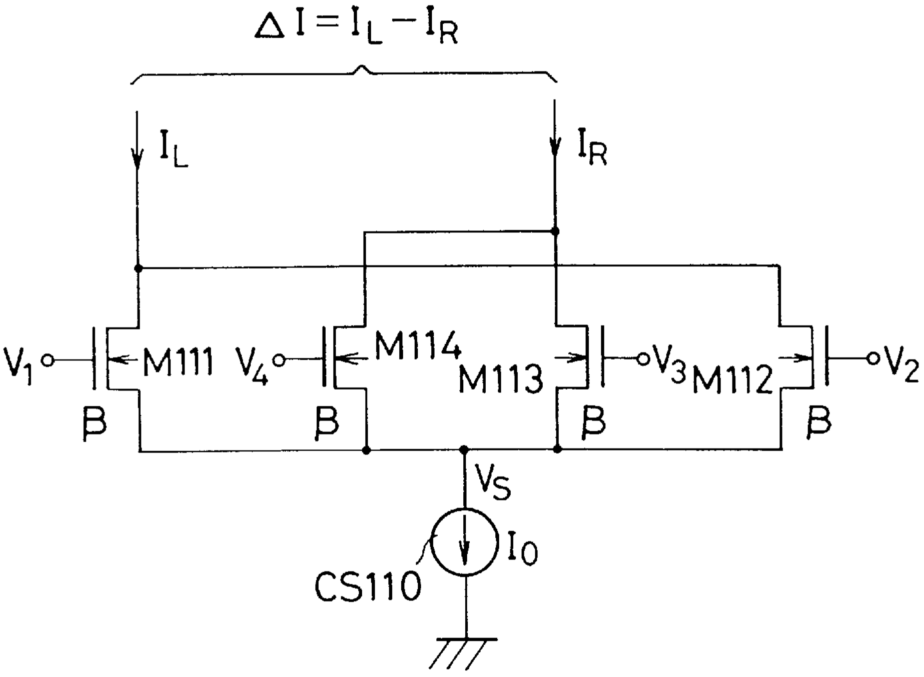
FIG.1 PRIOR ART
FIG. 1 is a circuit diagram showing a first example of the conventional MOS multiplier core circuits, which contains the basic or typical configuration and contains a quadritail cell.
Figure 2:
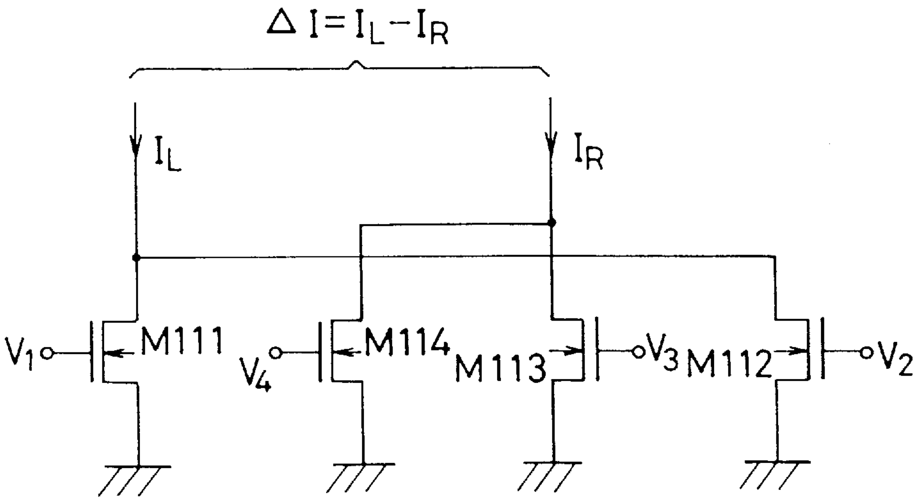
FIG.2 PRIOR ART
FIG. 2 is a circuit diagram showing a second example of the conventional MOS multiplier core circuits, which contains the grounded sources of the MOSFETs.
Figure 3:
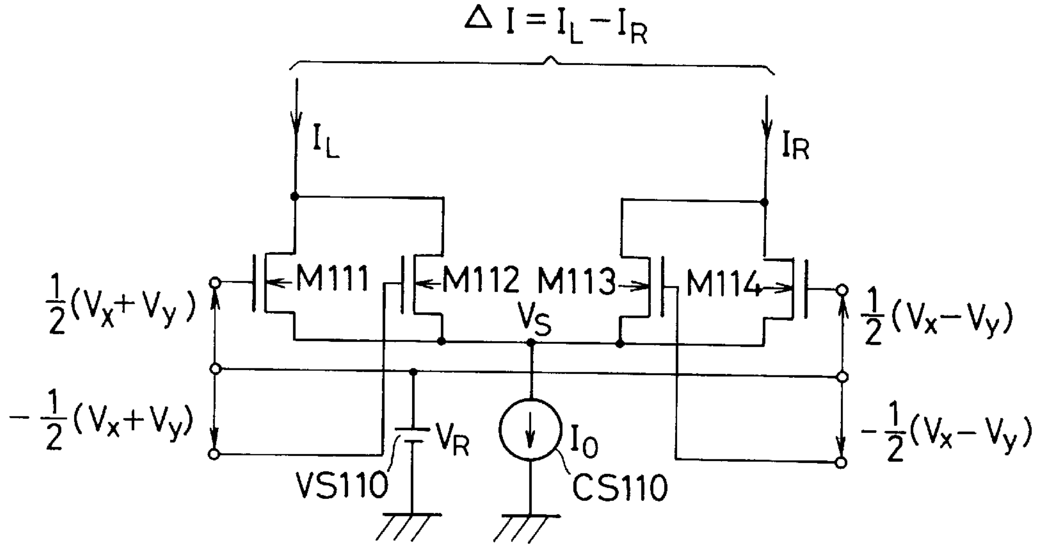
FIG. 3 PRIOR ART
FIG. 3 is a circuit diagram showing a third example of the conventional MOS multiplier core circuits, which contains a quadritail cell and was proposed by Bult and Wallinga.
Figure 4:
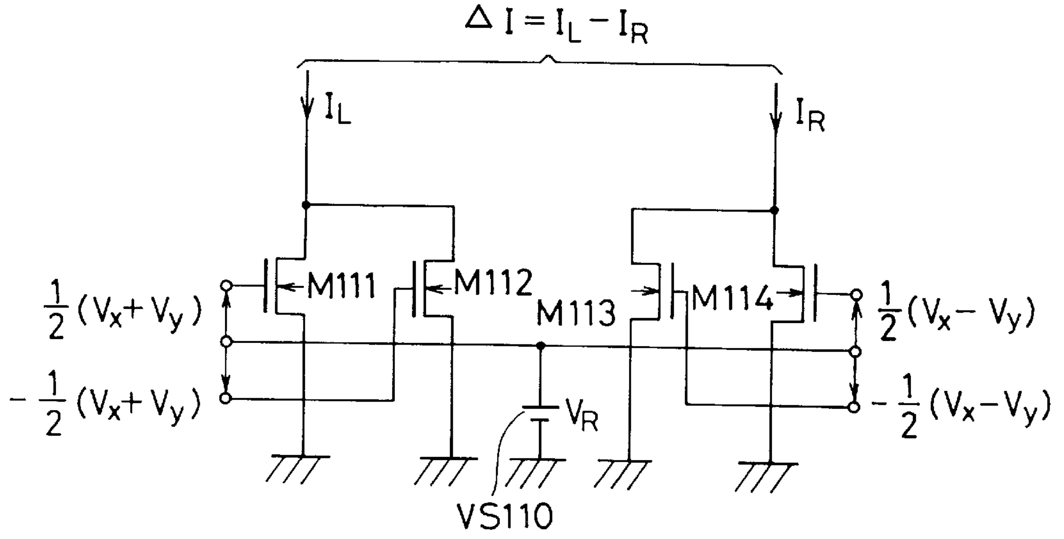
FIG. 4 PRIOR ART
FIG. 4 is a circuit diagram showing a fourth example of the conventional MOS multiplier core circuits, which contains the grounded sources of the MOSFETs and was proposed by Bult and Wallinga.
Figure 5:
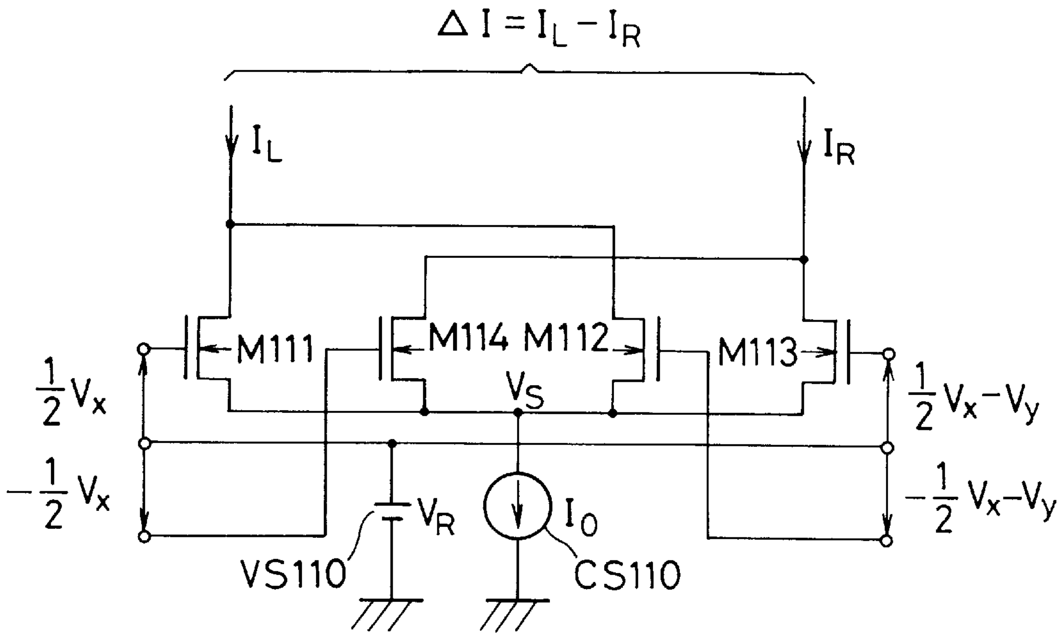
FIG. 5 PRIOR ART
FIG. 5 is a circuit diagram showing a fifth example of the conventional MOS multiplier core circuits, which contains a quadritail circuit and was reproposed by Wang.
Figure 6:
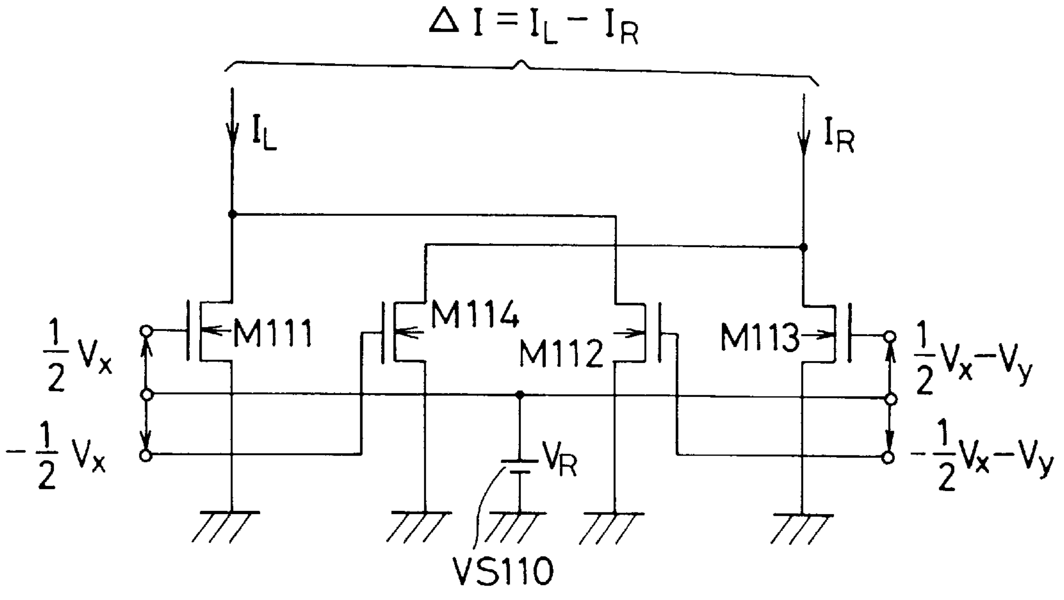
FIG. 6 PRIOR ART
FIG. 6 is a circuit diagram showing a sixth example of the conventional MOS multiplier core circuits, which contains the grounded sources of the MOSFETs and was proposed by Wu and Schaumann.
Figure 7:
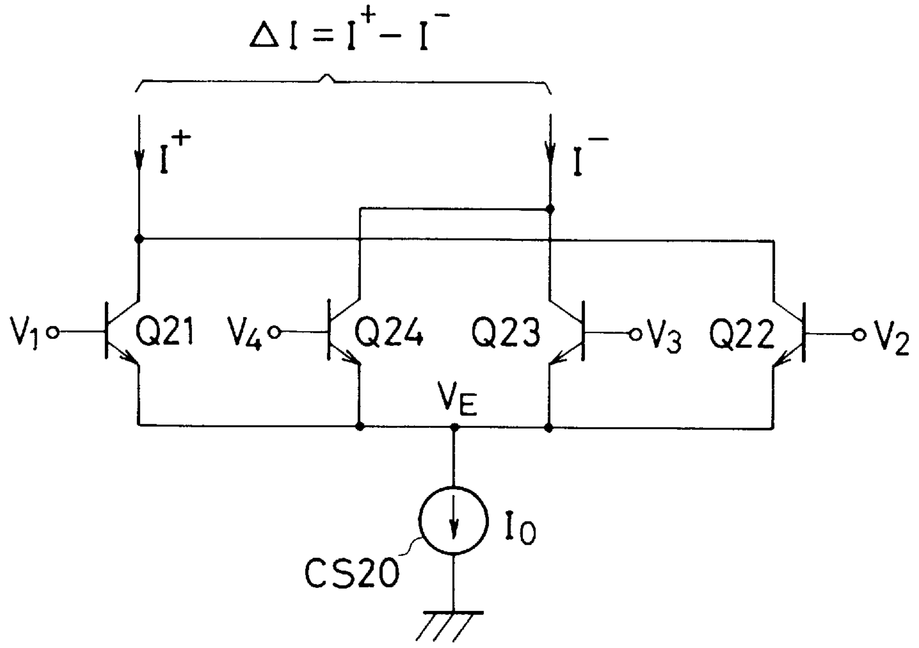
FIG 7 PRIOR ART
FIG. 7 is a circuit diagram showing a first example of the conventional bipolar multiplier core circuits, which contains the basic or typical configuration and a quadritail cell.
Figure 8:
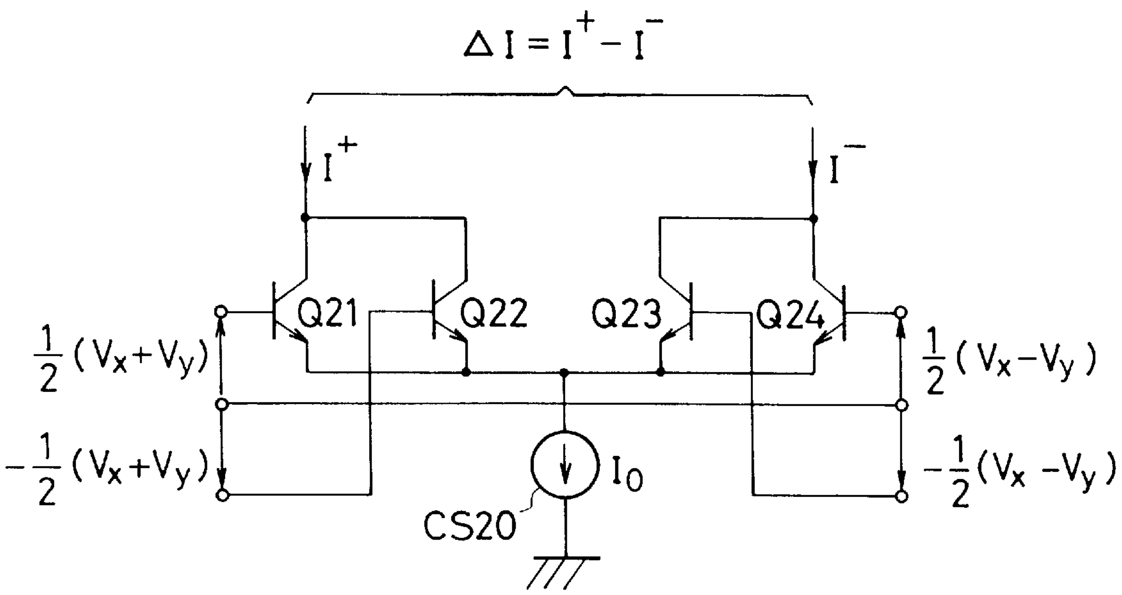
FIG.8 PRIOR ART
FIG. 8 is a circuit diagram showing a second example of the conventional bipolar multiplier core circuits which contains a quadritail cell and is obtained based on the circuit of FIG. 3.
Figure 9:
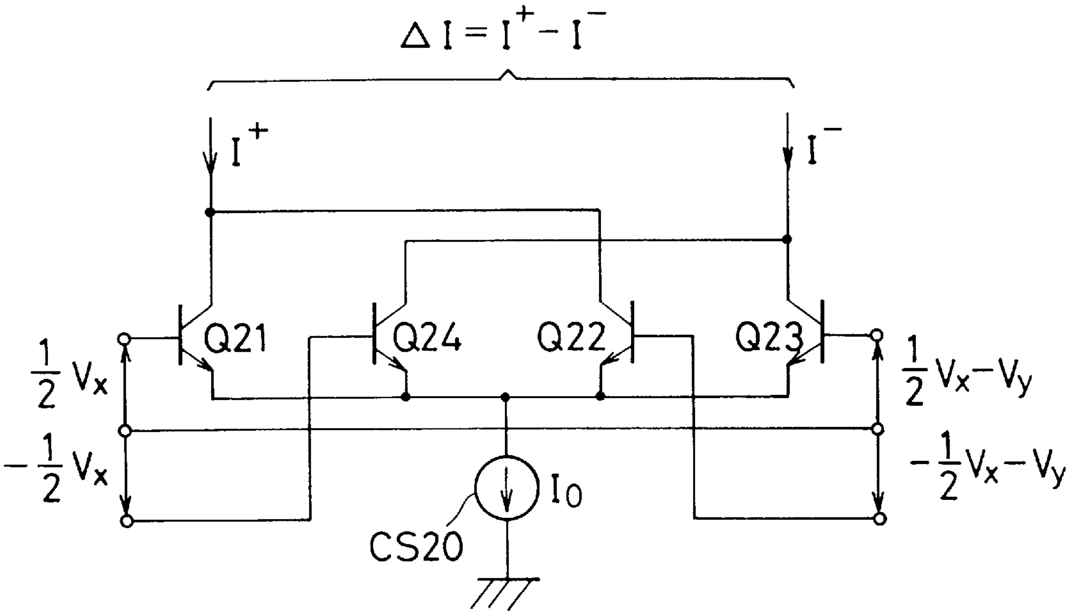
FIG.9 PRIOR ART
FIG. 9 is a circuit diagram showing a third example of the conventional bipolar multiplier core circuits, which contains a quadritail cell and is obtained based on the circuit of FIG. 5.

The equations (30a), (30b) and (30c) are the same as those of the multiplier core circuit of FIG. 3 proposed by Bult and Wallinga and those of the multiplier core circuit of FIG. 5 originally developed by Bult and reproposed by Wang.

Therefore, the MOS multiplier core circuit of the first embodiment in FIG. 10 can provide an ideal multiplier characteristic within the ranges where none of the MOSFETs M1, M2, M3 and M4 are cut off, in other words, the input voltage ranges shown in the equation (30a).

However, as the input voltages $V_x$ and $V_y$ increase, the MOSFETs M1, M2, M3 and M4 start to be cut off, resulting in deviation from the ideal multiplier characteristic.

Figure 11:
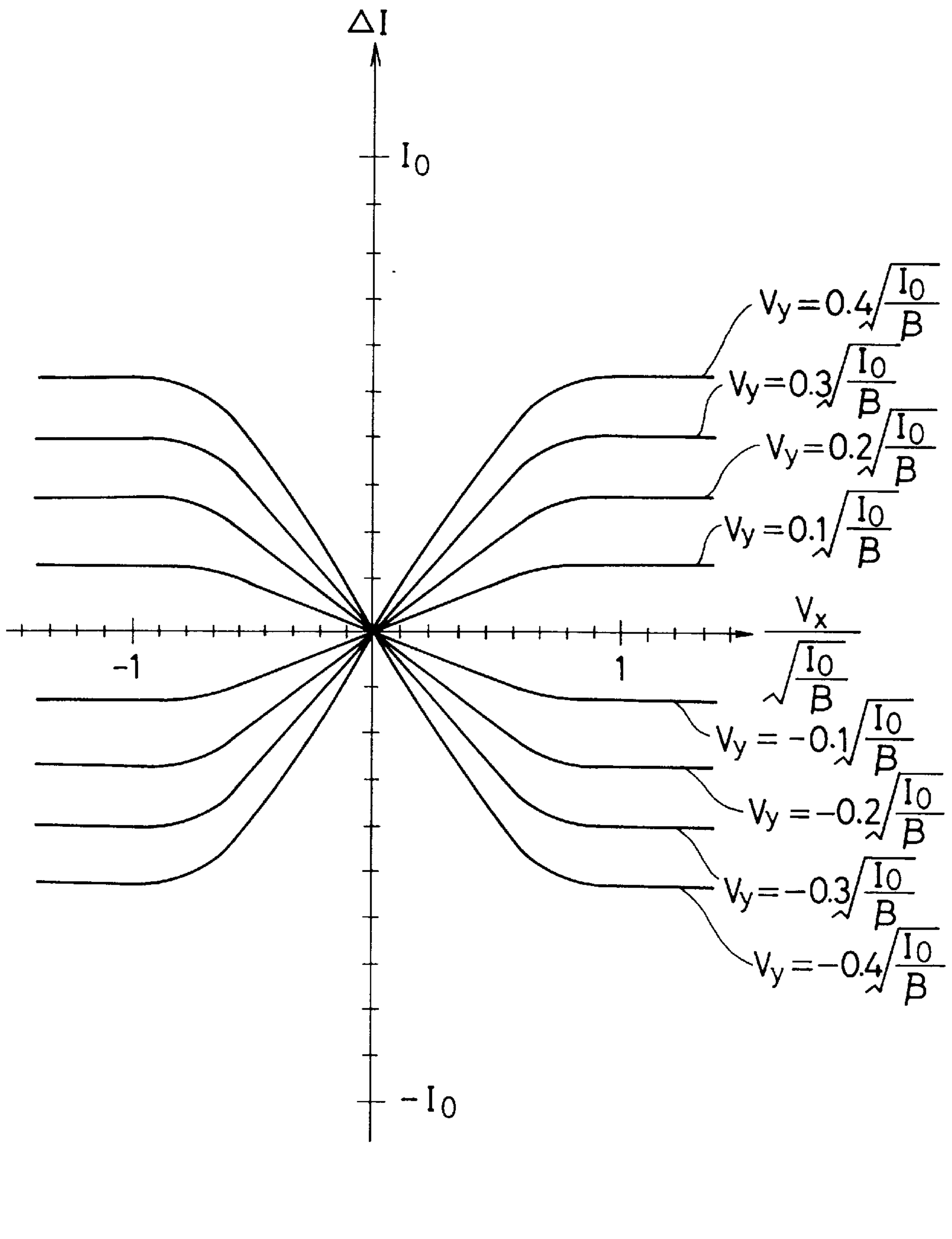
FIG. 11 shows the transfer characteristic of the multiplier core circuit of FIG. 10.

FIG. 11 shows the transconductance characteristic of the multiplier core circuit of the first embodiment with the input voltage $V_y$ as a parameter, which is obtained by the equations (30a), (30b) and (30c). It is seen from FIG. 11 that this circuit has a limiting characteristic caused by the tail current $I_0$ for large input voltages.

The transconductance characteristic of the multiplier core circuit of FIG. 10 is given by differentiating the equations (30a), (30b) and (30c) by the input voltage $V_x$ or $V_y$. The following equations (31a), (31b) and (31c) show the transconductance characteristic obtained by differentiating the equations (30a), (30b) and (30c) by the input voltage $V_x$.

$$\frac{d(\Delta I)}{dV_x} = 2\beta V_y \quad (31a)$$

-continued $$\left(V_x^2 + V_y^2 + |V_xV_y| \leqq \frac{I_0}{2\beta}\right)$$

$$\frac{d(\Delta I)}{dV_x} = \frac{4}{3}\beta V_y - \frac{4}{9}\,\mathrm{sgn}(V_xV_y)\left\{(|V_x| + |V_y|) - 2\beta\sqrt{\frac{3I_0}{\beta} - 2(|V_x| + |V_y|)^2 + 6V_xV_y} + \frac{4\beta(|V_x| + |V_y|)^2}{\sqrt{\frac{3I_0}{\beta} - 2(|V_x| + |V_y|)^2 + 6V_xV_y}}\right\} \quad (31b)$$

$$\left(V_x^2 + V_y^2 + |V_xV_y| \geqq \frac{I_0}{2\beta} \geqq V_x^2 + V_y^2 - \frac{5}{3}|V_xV_y|\right)$$

$$\frac{d(\Delta I)}{dV_x} = 0 \quad (31c)$$

$$\left(V_x^2 + V_y^2 - \frac{5}{3}|V_xV_y| \geqq \frac{I_0}{2\beta}\right)$$

Figure 12:
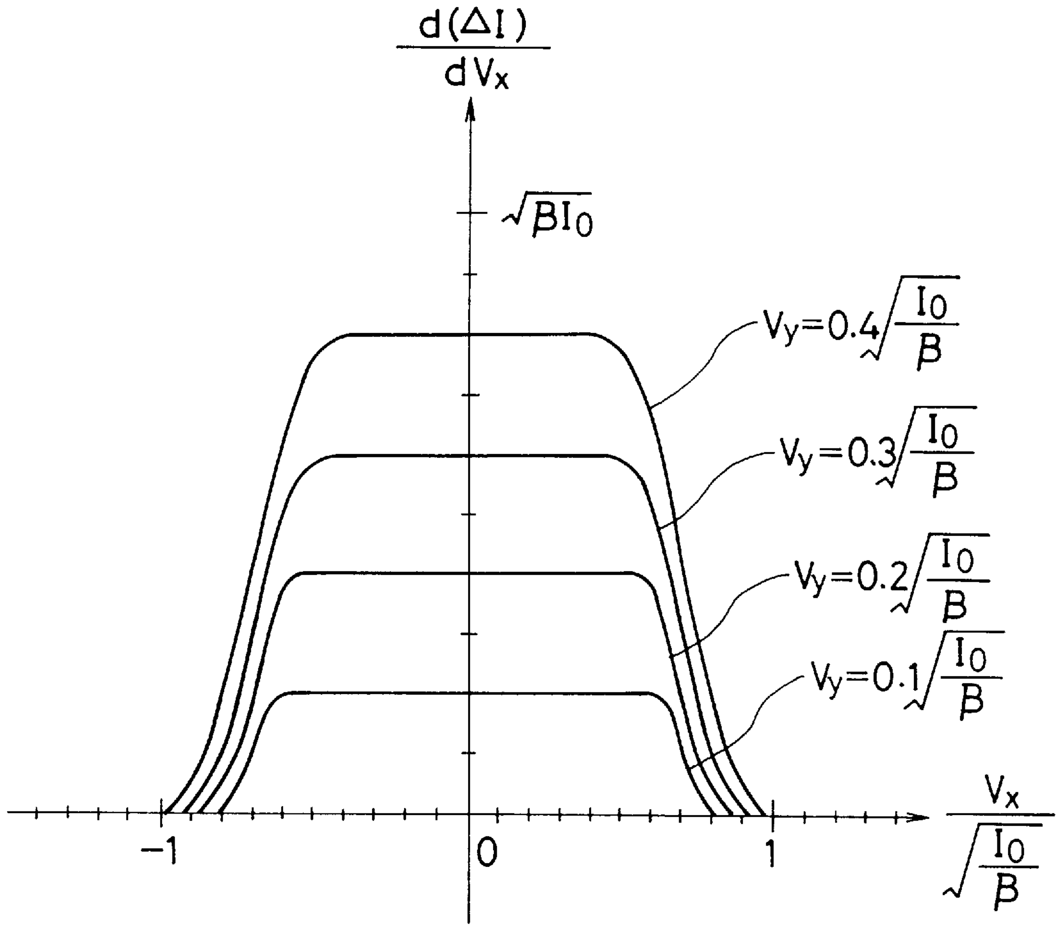
FIG. 12 shows the transconductance characteristic of the multiplier core circuit of FIG. 10.

FIG. 12 shows the transconductance characteristic of the multiplier core circuit of the first embodiment with the input voltage $V_y$ as a parameter, which is obtained by the equations (31a), (31b) and (31c).

It is seen from FIG. 12 that the transconductance characteristic is perfectly flat within the specified range of the input voltage $V_x$, which means that the circuit has a linear relationship between the input voltages and output current. Also, it is seen that the same transconductance characteristic is obtained for the two input voltages $V_x$ and $V_y$.

As described above, with the multiplier core circuit of the first embodiment, since the input voltages for the first to fourth MOSFETs M1, M2, M3 and M4 are $[-V_x+(½)V_y]$, $(V_x+V_y)$, $(-V_x+V_y)$, and $[V_x+(½)V_y]$, respectively, the linear multiplier characteristic and low supply-voltage operation can be obtained independent of the threshold voltage.

Also, the input subcircuit for converting the two input voltages $V_x$ and $V_y$ to be multiplied into four voltages $[-V_x+(½)V_y]$, $(V_x+V_y)$, $(-V_x+V_y)$, and $[V_x+(½)V_y]$ can be small in scale.

Since the first to fourth MOSFETs M1, M2, M3 and M4 are driven by the common tail current $I_0$, this core circuit has floating inputs and a limiting multiplier characteristic, and therefore, it is preferable for LSIs.

Further, this multiplier core circuit can be fabricated through the CMOS processes.

If either of the input voltages $V_x$ and $V_y$ is used as a signal for controlling the gain of the circuit, this core circuit may be used as an automatic gain control (AGC) circuit in consideration with the limiting characteristic.

If this core circuit is used as an operational transconductance amplifier (OTA), an input subcircuit therefor can be small in scale.

Figure 13:
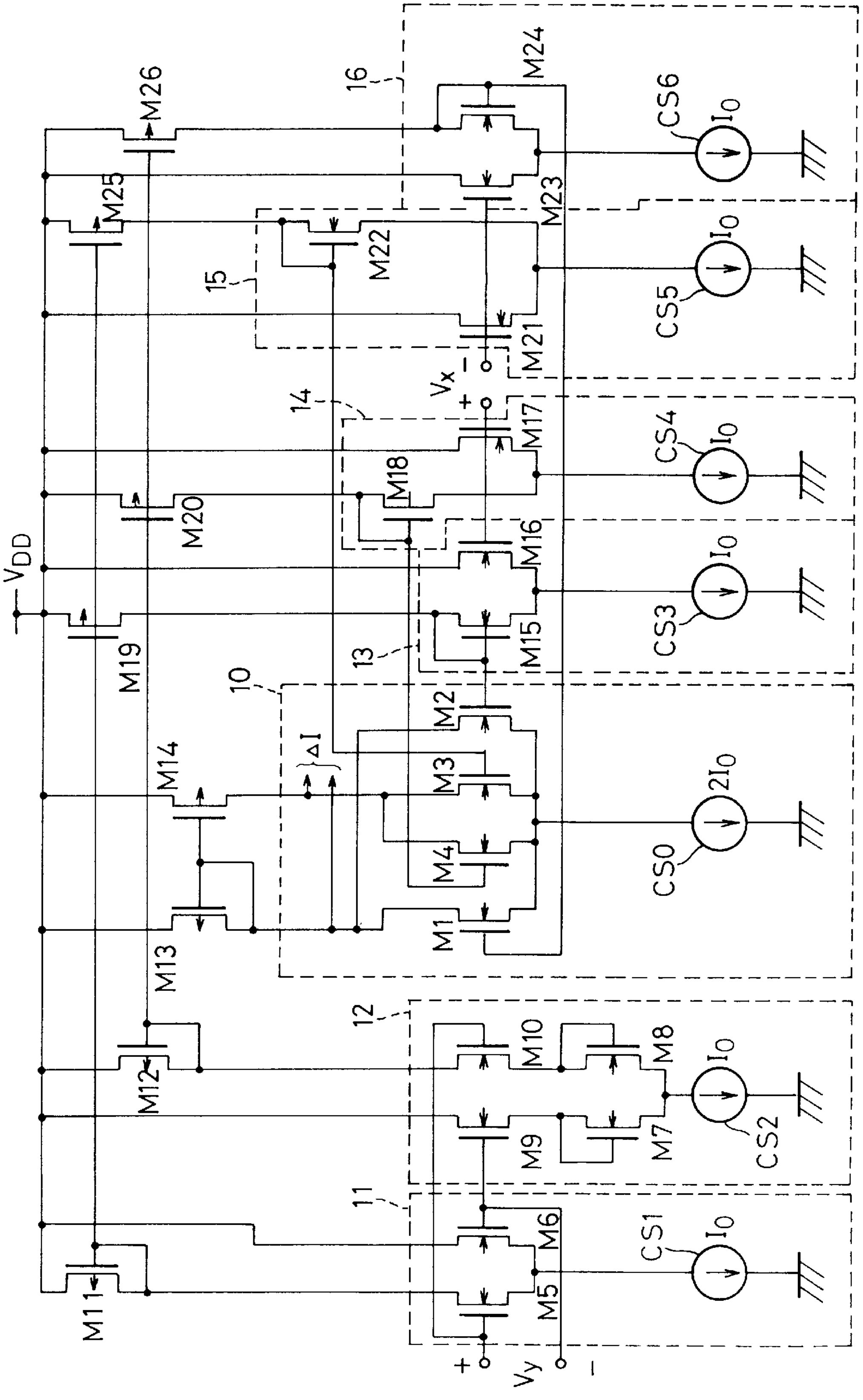
FIG. 13 is a circuit diagram showing an MOS analog multiplier including the multiplier core circuit of FIG. 10.

FIG. 13 shows a four-quadrant CMOS analog multiplier using the multiplier core circuit according to the first embodiment.

In FIG. 13, a subcircuit 10 forms a multiplier core circuit according to the first embodiment of FIG. 10, in which the common tail current supplied from the constant current source CS0 is $2I_0$. MOSFETs M13 and M14 form an active load of the core circuit.

A subcircuit 11 is composed of n-channel MOSFETs M5 and M6 and a constant current source CS1 (current: $I_0$). The input voltage $V_y$ is applied across the gates of the MOSFETs M5 and M6.

A subcircuit 12 is composed of n-channel MOSFETs M7, M8, M9 and M10 and a constant current source CS2

(current: $I_0$). This subcircuit 12 produces a half of the input voltage $V_y$, i. e., $(½)V_y$.

A subcircuit 13 is composed of n-channel MOSFETs M15 and M16 and a constant current source CS3 (current: $I_0$). A subcircuit 14 is composed of n-channel MOSFETs M17 and M18 and a constant current source CS4 (current: $I_0$). A subcircuit 15 is composed of n-channel MOSFETs M21 and M22 and a constant current source CS5 (current: $I_0$). A subcircuit 16 is composed of n-channel MOSFETs M23 and M24 and a constant current source CS6 (current: $I_0$).

The input voltage $V_x$ is applied across the gates of the MOSFETs M17 and M21 and the gates of the MOSFETs M16 and M23, respectively.

The input voltage $V_y$ applied across the gates of the MOSFETs M5 and M6 in the subcircuit 11 is transferred through p-channel MOSFET5 M11, M19 and M25 to the MOSFETs M15 and M22. The positive voltage $V_y$ is then added to the positive voltage $V_x$ applied to the gate of the MOSFET M16, producing the voltage $(V_x+V_y)$ to be applied to the gate of the MOSFET M2.

On the other hand, the negative voltage $-V_x$ applied to the gate of the MOSFET M21 is added to the voltage $V_y$ applied to the gate of the MOSFET M2, producing the voltage of $(-V_x+V_y)$ to be applied to the gate of the MOSFET M3.

Also, the input voltage $(½)V_y$ produced by the subcircuit 12 is transferred through p-channel MOSFETs M13, M20 and M26 to the MOSFETs M18 and M24. The positive voltage $(½)V_y$ is then added to the negative voltage $-V_x$, producing the voltage $[-V_x+(½)V_y]$ to be applied to the gate of the MOSFET M1.

On the other hand, the positive voltage $V_x$ is then added to the positive voltage $(½)V_y$, producing the voltage $[V_x+(½)\ V_y]$ to be applied to the gate of the MOSFET M4.

With the multiplier shown in FIG. 13, the number of the differential transistor pairs forming the adders is large, resulting in a large consumption current. Also, because the MOSFETs are vertically stacked at three levels because of the subcircuit 12, this multiplier requires the lowest supply voltage of about 3 V.

Figure 14:
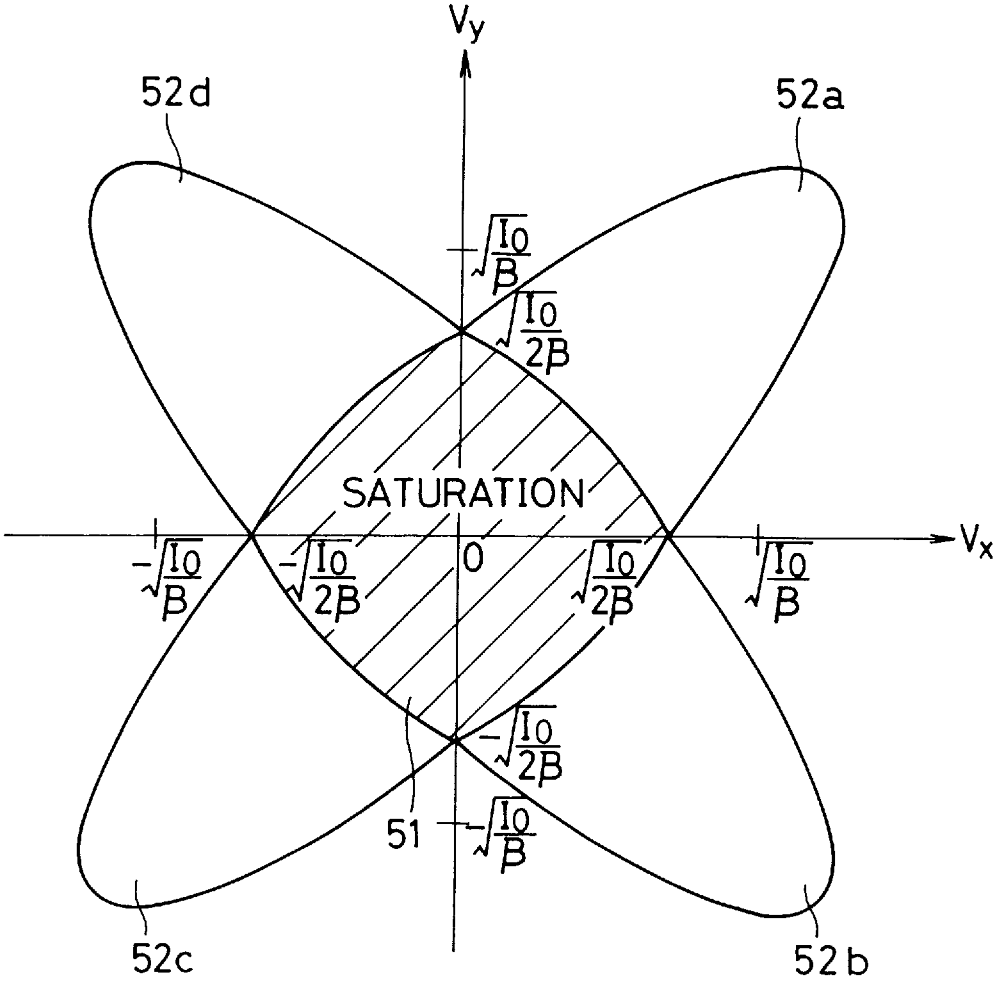
FIG. 14 shows the relationship between the input voltage ranges of $V_x$ and $V_y$ and the operating situations of the MOSFETs according to the multiplier core circuit of FIG. 10.

FIG. 14 shows the operating regions for the input voltages $V_x$ and $V_y$ of the multiplier core circuit of the first embodiment. In FIG. 14, the central hatched area 51 of a diamond shape denotes the normally operating region that provides the ideal multiplier characteristic and that corresponds to the equation (30a). Four protruding areas 52*a*, 52*b*, 52*c* and 52*d* from the area 51 denote the abnormally operating region that corresponds to the equation (30b). The remaining area denotes the non-operating region that corresponds to the equation (30c).

Figure 15:
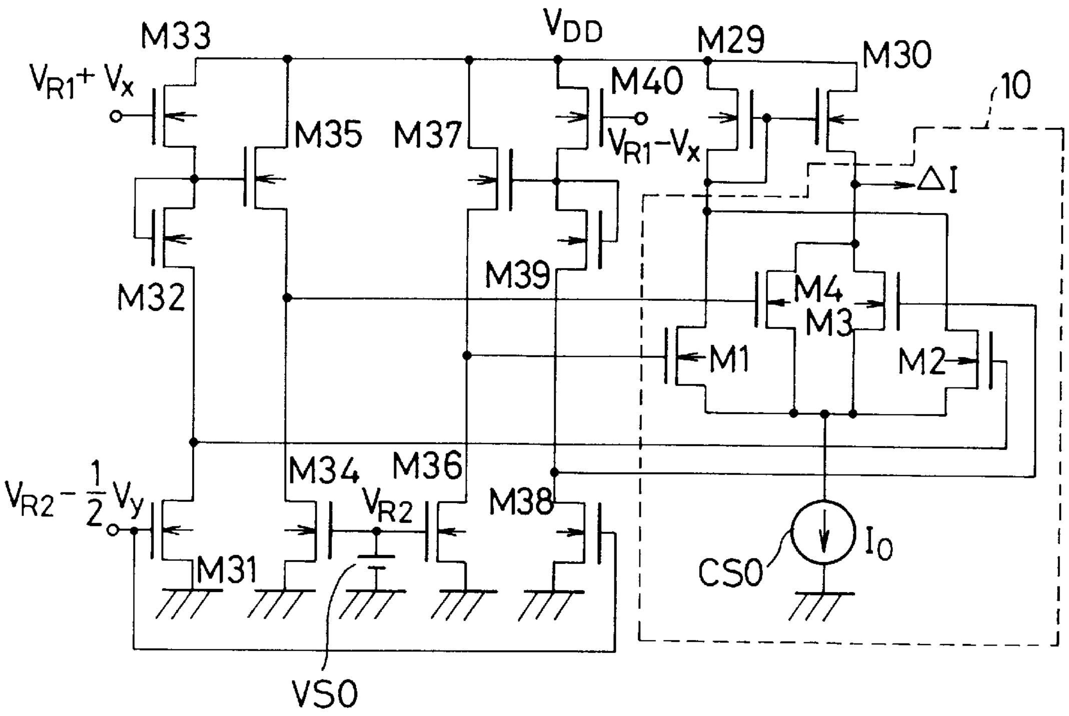
FIG. 15 is a circuit diagram showing another MOS analog multiplier including the multiplier core circuit of FIG. 10.

FIG. 15 shows another four-quadrant analog multiplier using the multiplier core circuit according to the first embodiment, in which cascoded MOSFETs whose sources are grounded are employed as the input subcircuit.

In FIG. 15, the subcircuit 10 forms the multiplier core circuit according to the first embodiment. MOSFETs M29 and M30 are an active load of the core circuit.

Four n-channel MOSFET5 M31, M34, M36 and M38 have grounded sources Gates of the MOSFETs M31 and M38 are grounded. A voltage source VS0 (voltage: $V_{R2}$) is connected between coupled gates of MOSFETs M34 and M36 and the ground.

N-channel MOSFETs M31, M32 and M33 are double-cascoded. N-channel MOSFETs M34 and M35 are cascoded. N-channel MOSFETs M36 and M37 are cascoded. N-channel MOSFETs M38, M39 and M40 are double-cascoded.

A voltage $[V_{R2}-(½)V_y]$ is applied across the gates of the MOSFETs M31 and M38. The constant dc voltage $V_{R2}$ is applied across the MOSFETs M34 and M36. A voltage $(V_{R1}-V_x)$ is applied to the gate of the MOSFET M40.

Using the cascoded subcircuits, The gate of the MOSFET M1 is applied with a voltage $[-V_{Rx}+(½)V_y]$. The gate of the MOSFET M2 is applied with a voltage $(V_{Rx}+V_y)$. The gate of the MOSFET M3 is applied with a voltage $(-V_{Rx}+V_y)$. The gate of the MOSFET M4 is applied with a voltage $[V_{Rx}+(½)\ V_y]$.

With the MOS multiplier shown in FIG. 15, since the cascoded MOSFETs M31, M32, M33 and M34 are current-driven and have floating inputs, the multiplier circuit of FIG. 15 operates differentially. Therefore, the four input voltages are the same in those of the circuit reproposed by Wang.

Also, compared with the case of Bult and Wallinga and the case of Wang, this multiplier core circuit of FIG. 15 reduces the necessary number of MOSFETs.

Further, this circuit can be operable at a low supply voltage.

Second Embodiment

Figure 16:
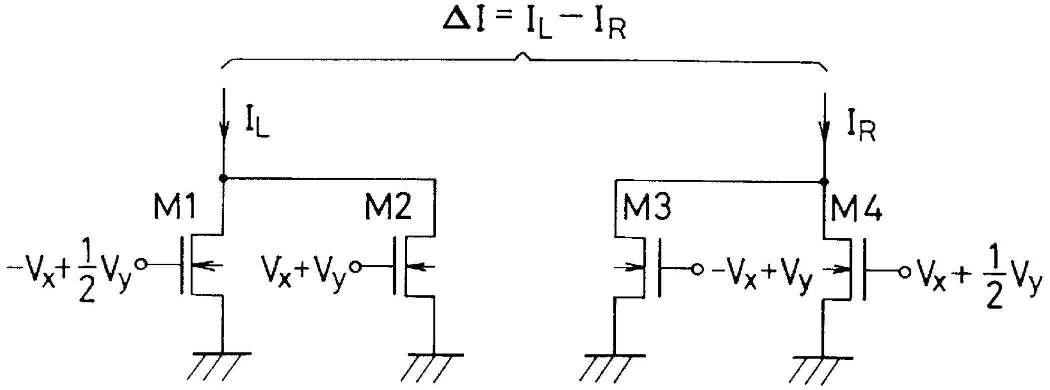
FIG. 16 is a circuit diagram showing a multiplier core circuit according to a second embodiment of the present invention, which contains the grounded sources of the MOSFETs.

FIG. 16 shows a four-quadrant multiplier core circuit according to a second embodiment of the present invention, which is composed of MOSFETs.

The circuit of the second embodiment has the same configuration as that of the first embodiment except that no constant current source is provided and that the sources of the MOSFETs M1, M2, M3 and M4 are directly grounded.

To realize a multiplier characteristic for the input voltages $V_x$ and $V_y$ to be multiplied, the input voltages $V_1$, $V_2$, $V_3$ and $V_4$ to the respective MOSFETs M1, M2, M3 and M4 can be expressed by the following equations (32), (33), (34) and (35), respectively.

$$I_{D1}=\beta\left(-V_x+\frac{V_y}{2}+V_R-V_{TH}\right)^2 \tag{32}$$

$$I_{D2}=\beta(V_x+V_y+V_R-V_{TH})^2 \tag{33}$$

$$I_{D3}=\beta(-V_x+V_y+V_R-V_{TH})^2 \tag{34}$$

$$I_{D4}=\beta\left(V_x+\frac{V_y}{2}+V_R-V_{TH}\right)^2 \tag{35}$$

The differential output current $\Delta I$ of the second embodiment is expressed by the following equations (36a), (36b), (36c), (36d), (36e) and (36f).

$$\begin{aligned}\Delta I &= I_L-I_R=(I_{D1}+I_{D2})-(I_{D3}+I_{D4})\\ &= 2\beta V_xV_y\\ &\quad (M_1, M_2, M_3, M_4\text{: saturation})\end{aligned} \tag{36a}$$

$$\begin{aligned}\Delta I &= I_L-I_R=(I_{D1}+I_{D2})-(I_{D3}+I_{D4})\\ &= 2\beta V_xV_y-\beta\left(-V_x+\frac{V_y}{2}+V_R-V_{TH}\right)^2\\ &\quad (M_1\text{: cutoff})\end{aligned} \tag{36b}$$

$$\begin{aligned}\Delta I &= I_L-I_R=(I_{D1}+I_{D2})-(I_{D3}+I_{D4})\\ &= 2\beta V_xV_y-\beta\left(V_x+\frac{V_y}{2}+V_R-V_{TH}\right)^2\\ &\quad (M_4\text{: cutoff})\end{aligned} \tag{36c}$$

$$\begin{aligned}\Delta I &= I_L-I_R=(I_{D1}+I_{D2})-(I_{D3}+I_{D4})\\ &= 2\beta V_xV_y-\beta(-V_x+V_y+V_R-V_{TH})^2\\ &\quad (M_3\text{: cutoff})\end{aligned} \tag{36d}$$

-continued $$\Delta I = I_L - I_R = (I_{D1} + I_{D2}) - (I_{D3} + I_{D4}) = 4\beta V_x (V_y + V_R - V_{TH})^2 \quad (M_1, M_4\text{: cutoff}) \tag{36e}$$

$$\Delta I = I_L - I_R = (I_{D1} + I_{D2}) - (I_{D3} + I_{D4}) = \left\{ \frac{3}{4} V_y^2 - V_y(V_x + V_R - V_{TH}) \right\} \quad (M_1, M_3\text{: cutoff}) \tag{36f}$$

$$\Delta I = I_L - I_R = (I_{D1} + I_{D2}) - (I_{D3} + I_{D4}) = \beta(V_x + V_y + V_R - V_{TH})^2 \quad (M_1, M_4, M_3\text{: cutoff}) \tag{36g}$$

With the multiplier core circuit of FIG. 16, the cut off conditions of MOSFETs M1, M2, M3 and M4 are different from each other in each quadrant of $V_x$ and $V_y$. In the first quadrant where $V_x \geqq 0$ and $V_y \geqq 0$, no MOSFETs M1, M2, M3 and M4 are cut off. The dc voltages contained in the input voltages $V_x$ and $V_y$ can be optionally decided. The four input voltages into the MOSFETs M1, M2, M3 and M4, i.e., $[-V_x+(½)V_y]$, $(V_x+V_y)$, $(-V_x+V_y)$ and $[V_x+(½)V_y]$, can be set within the no cut-off ranges by using attenuators. Therefore, it is seen from the equations (32), (33), (34), (35), (36a), (36b), (36c), (36d), (36e), (36f) and (36g) that no cut off occurs for the MOSFETs M1, M2, M3 and M4 in the first to fourth quadrants if the input voltage ranges are set to satisfy the relationship $|V_x|+|V_y| \leqq V_R-V_{TH}$.

The equation (36a) expresses the differential output current in the no cut-off region of the MOSFETs M1, M2, M3 and M4, which is perfectly linear. In other words, the multiplier core circuit of FIG. 16 can provide the ideal multiplication characteristic in the regions.

Figure 17:
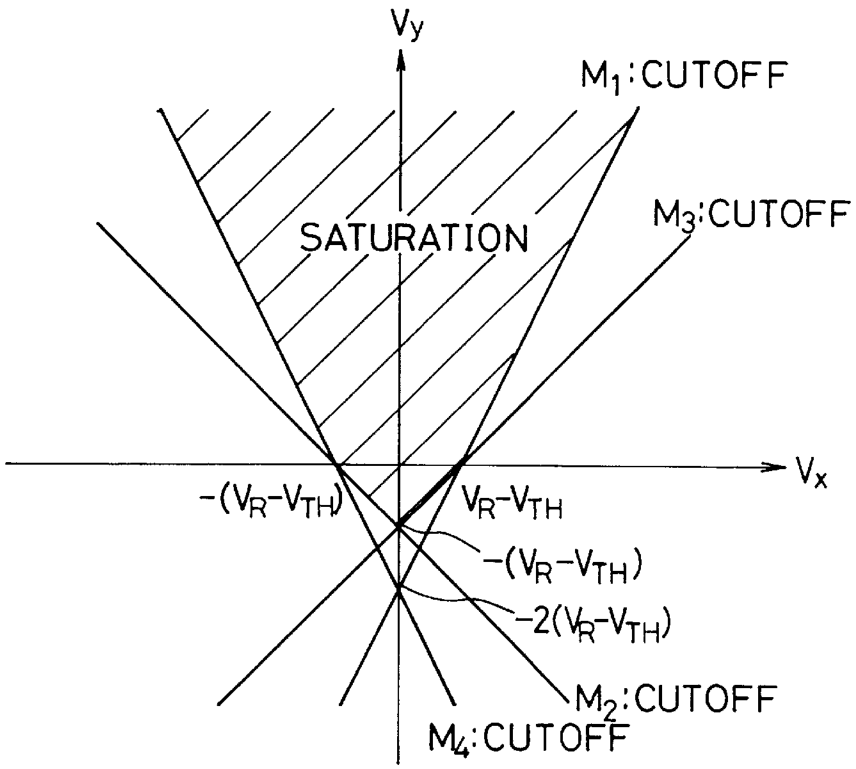
FIG. 17 shows the relationship between the input voltage ranges of $V_x$ and $V_y$ and the operating situations of the MOSFETs according to the multiplier core circuit of FIG. 16.

FIG. 17 shows the cut-off and saturation regions for the MOSFETs M1, M2, M3 and M4 with respect to $V_x$ and $V_y$. The hatched area indicates the saturation region where the relationship $|V_x|+|V_y| \leqq V_R-V_{TH}$ is established. As $V_x$ and $V_y$ increase, at least one of the MOSFETs M1, M2, M3 and M4 will cut off to deviate from the ideal multiplier characteristic.

If the above equation (36a) indicating the differential output current ΔI within the no cut-off ranges is differentiated by $V_x$ and $V_y$, the transconductance is given by the following equations (37a) and (37b)

$$\frac{d(\Delta I)}{dV_x} = 2\beta V_y \tag{37a}$$

$$\frac{d(\Delta I)}{dV_y} = 2\beta V_x \tag{37b}$$

It is seen from the equations (37a) and (37b) that the multiplier core circuit of FIG. 16 has the same transconductance characteristic for $V_x$ and $V_y$.

With the multiplier core circuit of FIG. 16, since no constant current source for driving the MOSFETs M1, M2, M3 and M4 is required, the core circuit can be reduced in circuit scale and be enlarged in the input voltage ranges.

Third Embodiment

Figure 18:
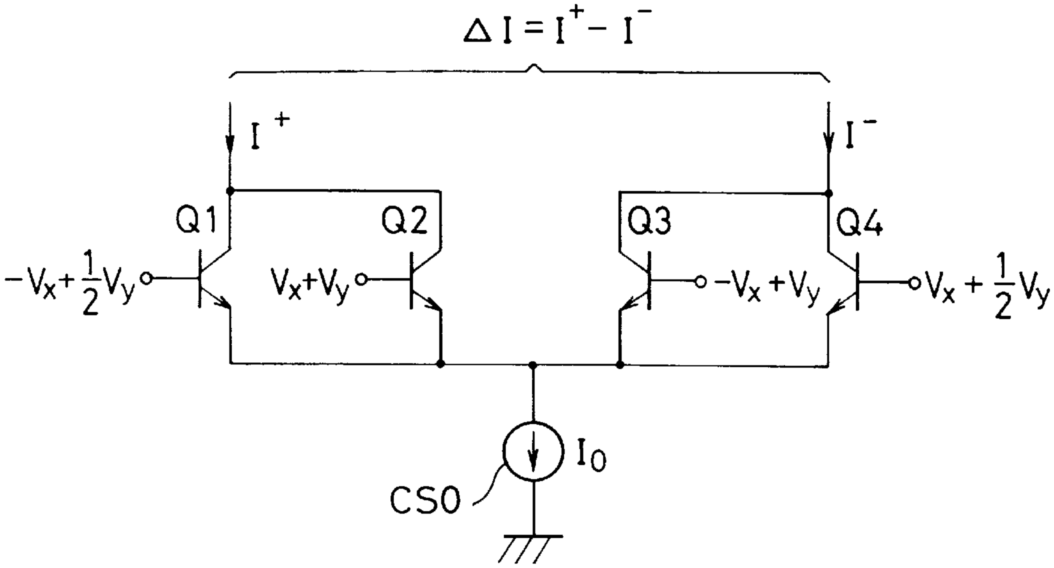
FIG. 18 is a circuit diagram showing a bipolar multiplier core circuit according to a third embodiment of the present invention, which contains a quadritail cell.

FIG. 18 shows a four-quadrant multiplier core circuit according to a third embodiment of the present invention, which is equivalent to a multiplier core circuit that is obtained by replacing the MOSFETs M1, M2, M3 and M4 in FIG. 10 of the first embodiment by bipolar transistors Q1, Q2, Q3 and Q4.

Specifically, as shown in FIG. 18, this circuit has a quadritail cell formed of first to fourth npn-type bipolar transistors Q1, Q2, Q3 and Q4 and a constant current source CS0 (current; $I_0$) for driving the quadritail cell. The transistors Q1, Q2, Q3 and Q4 have the same emitter area.

Emitters of the first to fourth transistors Q1, Q2, Q3 and Q4 are coupled together. The constant current source CS0 is connected to the coupled emitters and the ground, respectively. In other words, these transistors Q1, Q2, Q3 and Q4 are grounded through the current source CS0.

Collectors of the first and second transistors Q1 and Q2 are coupled together An output current $I^+$, which is equal to the sum of the collector currents of the transistors Q1 and Q2, is taken out from the coupled collectors of the transistors Q1 and Q2.

Collectors of the third and fourth transistors Q3 and Q4 are coupled together. Another output current $I^-$, which is equal to the sum of the collector currents of the transistors Q3 and Q4, is taken out from the coupled collectors of the transistors Q3 and Q4.

A differential output current ΔI of the multiplier core circuit is defined as the difference of the currents $I^+$ and $I^-$, i.e., $\Delta I=I^+-I^-$.

A base of the first transistor Q1 is applied with a voltage $[-V_x+(½)V_y]$. A base of the second transistor Q2 is applied with a voltage $(V_x+V_y)$. A base of the third transistor Q3 is applied with a voltage $(-V_x+V_y)$. A base of the fourth transistor Q4 is applied with a voltage $[V_x+(½)V_y]$.

The differential output current ΔI of this bipolar multiplier core circuit is given from the equation (19) as the following equation (38).

$$\Delta I = \alpha_F I_0 \tanh\left(\frac{V_x}{2V_T}\right)\tanh\left(\frac{V_y}{2V_T}\right) \tag{38}$$

The equation (38) is the same as the equations (20) and (22). The right-hand side of the equation (38) multiplied by $\alpha_F$ is equal to the differential output current of the well-known Gilbert multiplier cell.

As described previously, an obtainable value of $\alpha_F$ through the typical bipolar processes is in the range from 0.98 to 0.99, which is extremely near 1. Therefore, it is seen from the equation (38) that the multiplier core circuit of the third embodiment has the transfer characteristic approximately equal to that of the Gilbert multiplier cell.

Also, since this multiplier core circuit does not contain the transistors vertically stacked as in the Gilbert multiplier cell, it can operate at a lower supply voltage than the Gilbert multiplier cell.

Figure 19:
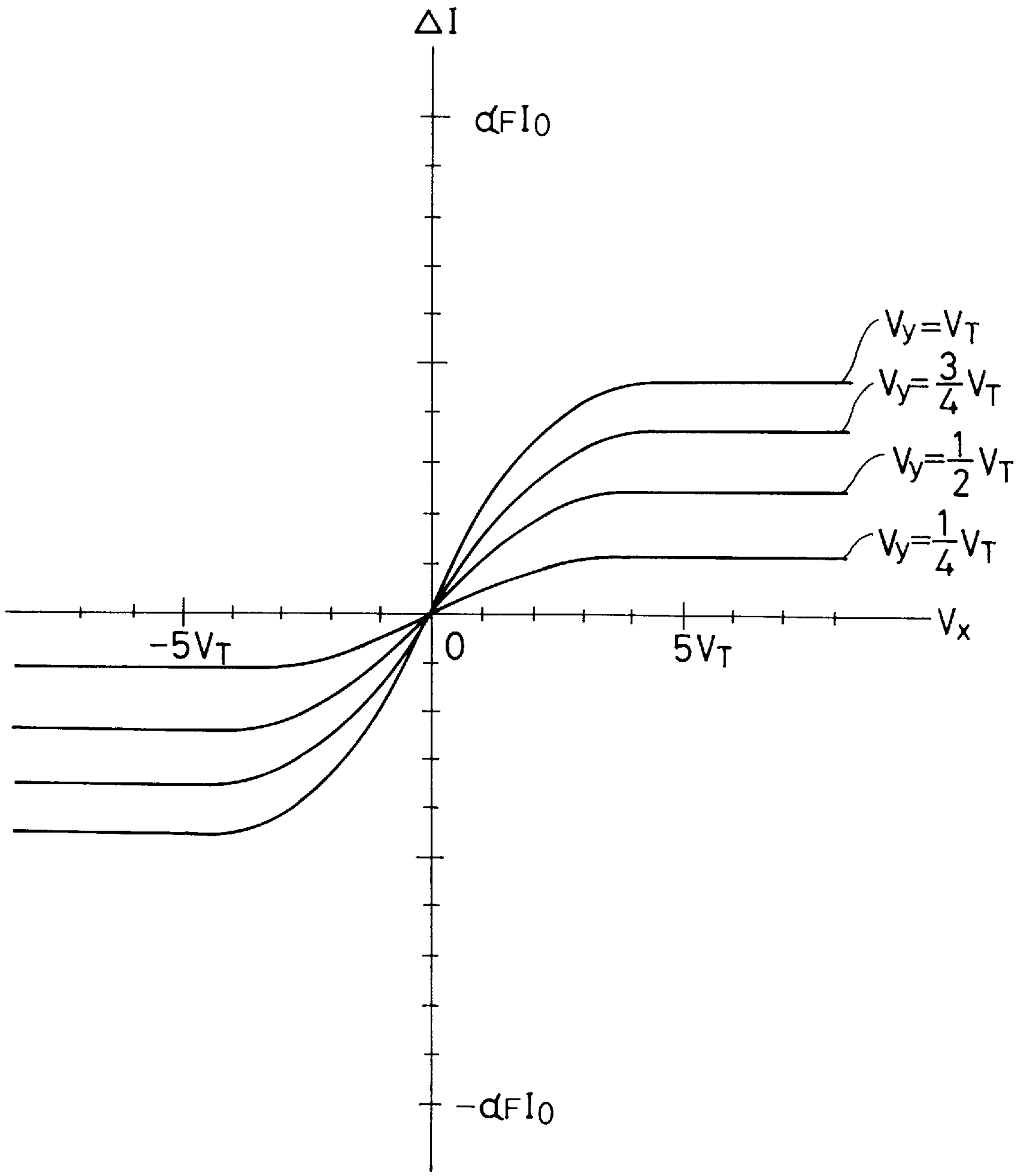
FIG. 19 shows the transfer characteristic of the multiplier core circuit of FIG. 18.

FIG. 19 shows the transfer characteristic of the bipolar multiplier core circuit of the third embodiment with the input voltage $V_y$ as a parameter, which is obtained by the equation (38). It is seen from FIG. 19 that the characteristic is approximately linear within the range of $|V_x| \leqq VT$ and that the circuit has a limiting characteristic caused by the tail current $I_0$ for large input voltages.

Figure 20:
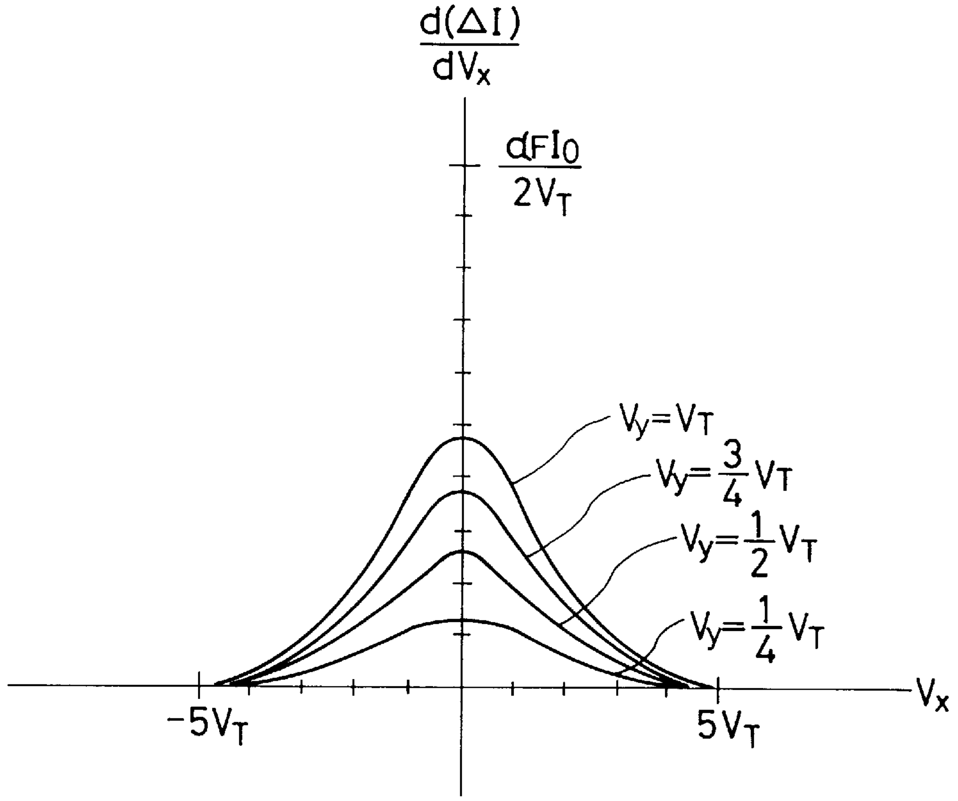
FIG. 20 shows the transconductance characteristic of the multiplier core circuit of FIG. 18.

FIG. 20 shows the transconductance characteristic of the multiplier core circuit of the third embodiment, which is given by differentiating the equation (38) by the voltage $V_x$ with the voltage $V_y$ as a parameter. It is seen from FIG. 20 that the transconductance characteristic is approximately flat within the range where $V_x$ is near zero (i. e., $|V_x|$=,0) that provides the approximately linear multiplier characteristic and that no perfectly linear characteristic as that in the MOS multiplier core circuits according to the first and second embodiments.

If the transistors Q1, Q2, Q3 and Q4 are directly grounded by removing the constant current source CS0 as shown in FIG. 16, the differential output current ΔI is given by the following equation (39).

$$\Delta I = 8I_0 \cosh\left(\frac{V_x}{2V_T}\right)\exp\left(\frac{3V_y}{4V_T}\right)\sinh\left(\frac{V_x}{2V_T}\right)\sinh\left(\frac{V_y}{4V_T}\right) \tag{39}$$

As seen from the equation (39), in this case, the transfer characteristic cannot be said as the multiplier one. This means that the first to fourth transistors Q1, Q2, Q3 and Q4 should be driven by a constant current source to realize a bipolar multiplier core circuit.

Generally, to realize a multiplier characteristic for the input voltages $V_x$ and $V_y$ to be multiplied, the four input voltages $V_1$, $V_2$, $V_3$ and $V_4$ to the respective MOSFETs M1, M2, M3 and M4 or respective bipolar transistors Q1, Q2, Q3 and Q4 can be expressed by the following generalized equations (40a) (40b), (40c) and (40d), where a, b and c are integers.

$$V_1 = aV_x + bV_y \tag{40a}$$

$$V_2 = (a-c)V_x + \left(b - \frac{1}{c}\right)V_y \tag{40b}$$

$$V_3 = (a-c)V_x + bV_y \tag{40c}$$

$$V_4 = aV_x + \left(b - \frac{1}{c}\right)V_y \tag{40d}$$

In the equations (40a), (40b), (40c) and (40d), the following relationships (41a) and (41b) are established.

$$V_1 - V_3 = V_4 - V_2 = cV_x \tag{41a}$$

$$V_1 - V_4 = V_3 - V_2 = \frac{V_y}{c} \tag{41b}$$

When the voltages $V_1$, $V_2$, $V_3$ and $V_4$ are applied to the gates of the respective MOSFETs M1, M2, M3 and M4, the drain currents of the MOSFETs M1, M2, M3 and M4 are expressed as the following equations (42a), (42b), (42c) and (42d).

$$I_{D1} = \beta(aV_x + bV_y + V_R - V_{TH})^2 \tag{42a}$$

$$I_{D2} = \beta\left\{(a-c)V_x + \left(b - \frac{1}{c}\right)V_y + V_R - V_{TH}\right\}^2 \tag{42b}$$

$$I_{D3} = \beta\{(a-c)V_x + bV_y + V_R - V_{TH}\}^2 \tag{42c}$$

$$I_{D4} = \beta\left\{aV_x + \left(b - \frac{1}{c}\right)V_y + V_R - V_{TH}\right\}^2 \tag{42d}$$

Accordingly, the differential output current of the multiplier core circuit is expressed as the following equation (43).

$$\begin{aligned}\Delta I &= (I_{D1} + I_{D2}) - (I_{D3} + I_{D4}) \\ &= \beta(aV_x + bV_y + V_R - V_{TH})^2 + \\ &\quad \beta\left\{(a-c)V_x + \left(b - \frac{1}{c}\right)V_y + V_R - V_{TH}\right\}^2 - \\ &\quad \beta\{(a-c)V_x + bV_y + V_R - V_{TH}\}^2 - \\ &\quad \beta\left\{aV_x + \left(b - \frac{1}{c}\right)V_y + V_R - V_{TH}\right\}^2 \\ &= 2\beta V_x V_y\end{aligned} \tag{43}$$

As seen from the equation (43), if the voltages $V_1$, $V_2$, $V_3$ and $V_4$ applied to the gates of the respective MOSFETs M1, M2, M3 and M4 satisfy the relationships (40a), (40b), (40c) and (40d), the circuit can operate as a multiplier core circuit.

Figure 21:
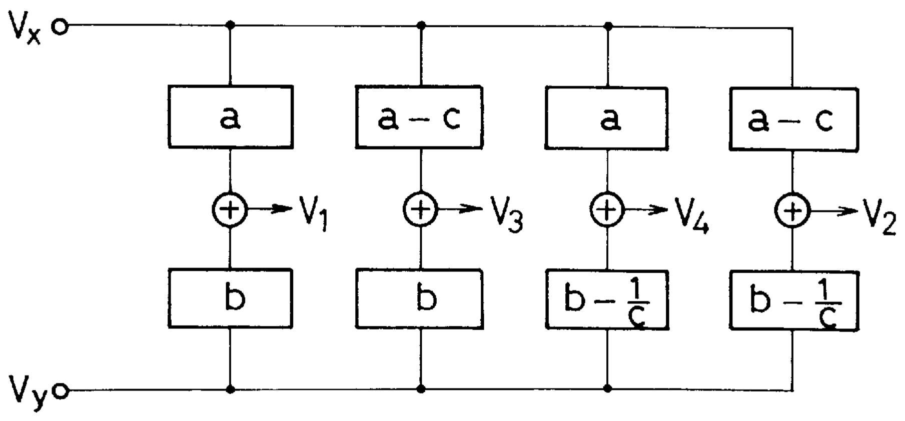
FIG. 21 is a block diagram showing an input subcircuit for producing the input signal voltages to the first to fourth transistors according to the invention.

FIG. 21 schematically shows an input circuit for producing the voltages $V_1$, $V_2$, $V_3$ and $V_4$ satisfying the relationships (40a), (40b), (40c) and (40d).

Since $V_1 = aV_x + bV_y$, the voltage $V_1$ is given by the sum of a times of $V_x$ and b times of $V_y$, which can be realized by active circuits using MOSFETs or bipolar transistors.

In the right-hand sides of the equations (40a), (40b), (40c) and (40d), the terms including negative coefficients need to be produced by active circuit elements such as MOSFETs or bipolar transistors.

Here, if a=½, b=1, c=1, the voltages $V_1$, $V_2$, $V_3$ and $V_4$ can be expressed as the following equations (44a), (44b), (44c) and (44d), respectively.

$$V_1 = V_x + V_y \tag{44a}$$

$$V_2 = \frac{V_x}{2} - V_y \tag{44b}$$

$$V_3 = \frac{V_x}{2} + V_y \tag{44c}$$

$$V_4 = V_x - V_y \tag{44d}$$

If the voltages $V_x$ and $V_y$ are replaced with each other in the equations (44a), (44b), (44c) and (44d), the voltages $V_1$, $V_2$, $V_3$ and $V_4$ accord with those of the circuit of the first embodiment shown in FIG. 10, respectively.

Fourth Embodiment

Figure 22:
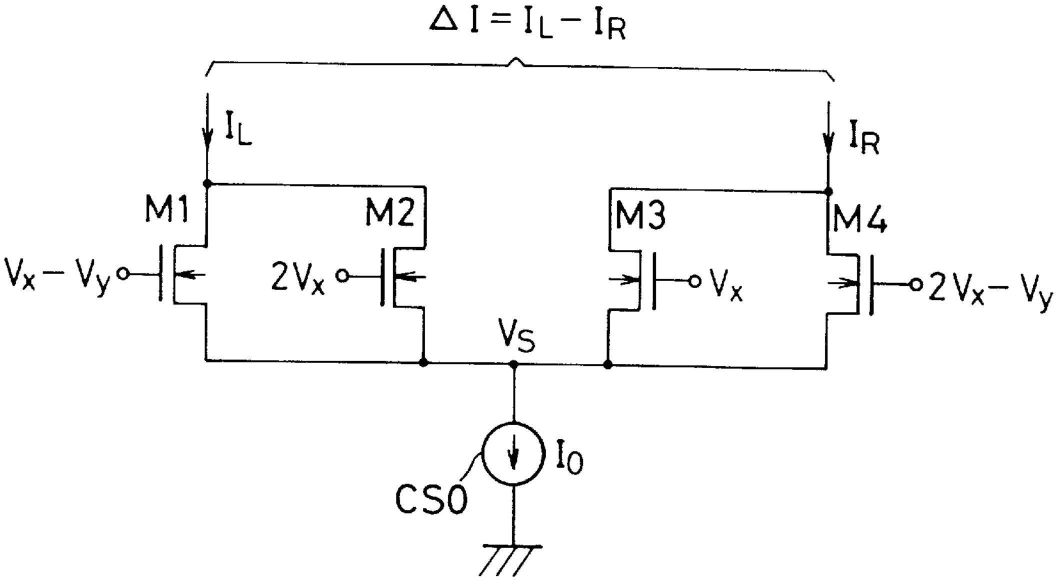
FIG. 22 is a circuit diagram showing an MOS multiplier core circuit according to a fourth embodiment of the present invention, which contains a quadritail cell.

FIG. 22 shows a four-quadrant multiplier core circuit according to a fourth embodiment of the present invention, which is composed of MOSFETs.

As shown in FIG. 22, this circuit is the same in configuration as that of the first embodiment shown in FIG. 10 except for the input voltage combination.

The following input voltages are applied to the gates of the respective MOSFETs M1, M2, M3 and M4 through an input subcircuit (not shown). Specifically, a gate of the first MOSFET M1 is applied with a voltage $(V_x - V_y)$. A gate of the second MOSFET M2 is applied with a voltage $2V_x$. A gate of the third MOSFET M3 is applied with a voltage $V_x$. A gate of the fourth MOSFET M4 is applied with a voltage $(2V_x - V_y)$.

The following linear algebraic equation (24) including four squares can be defined, in which a surplus or extra parameter c is added.

$$a-b-c)^2+(2a-c)^2-(a-c)^2-(2a-b-c)^2=2ab \tag{45}$$

In this case, the input voltage combination is expressed as follows.

$$V_1 = a-b$$

$$V_2 = 2a$$

$$V_3 = a$$

$$V_4 = 2a-b$$

If these four equations are substituted into the above equation (8), the following equations are obtained where $V_1+V_4=3a+2b$, and $V_2+V_3=3a$.

$$V_1 - V_4 = -a$$

$$V_1 + V_4 V_2 V_3 = 2b$$

As a result, $\Delta I/\beta = 2ab$ can be obtained.

These equations show the relationships between the four voltages $V_1$, $V_2$, $V_3$ and $V_4$ applied to their gates. Accordingly, it is seen that a multiplier core circuit excluding the unnecessary parameter c can be realized using such the input voltage combination.

Drain currents $I_{D1}$, $I_{D2}$, $I_{D3}$ and $I_{D4}$ of the MOSFETs M1, M2, M3 and M4 are expressed as the following equations (46), (47), (48) and (49), respectively, where $V_R$ is the dc voltage contained in the voltages $V_1$, $V_2$, $V_3$ and $V_4$, and $V_S$ is the common source voltage.

$$I_{D1}=\beta(V_x-V_y+V_R-V_S-V_{TH})^2 \tag{46}$$

$$I_{D2}=\beta(2V_x+V_R-V_S-V_{TH})^2 \tag{47}$$

$$I_{D3}=\beta(V_x+V_R-V_S-V_{TH})^2 \tag{48}$$

$$I_{D4}=\beta(2V_x-V_y+V_R-V_S-V_{TH})^2 \tag{49}$$

Since the four MOSFETs M1, M2, M3 and M4 are driven by the common tail current $I_0$, the following equation (50) is established.

$$I_{D1}+I_{D2}+I_{D3}+I_{D4}=I_0 \tag{50}$$

As a result, the differential output current ΔI of the multiplier core circuit of FIG. 22 is expressed as the following equations (51a), (51b) and (51c).

$$\begin{aligned}\Delta I &= I_L - I_R = (I_{D1}+I_{D2}) - (I_{D3}+I_{D4}) \\ &= 2\beta V_xV_y\end{aligned} \tag{51a}$$

$$\left( V_x^2+V_y^2+|V_xV_y| \leqq \frac{I_0}{2\beta} \right)$$

$$\begin{aligned}\Delta I &= I_L - I_R = (I_{D1}+I_{D2}) - (I_{D3}+I_{D4}) \\ &= \frac{4}{3}\beta V_xV_y - \frac{1}{9}\,\mathrm{sgn}(V_xV_y)\left\{ 3I_0 + \beta(|V_x|+|V_y|)^2 - 4\beta(|V_x|+ \right. \\ &\left. |V_y|)\sqrt{\frac{3U_0}{\beta} - 2(|V_x|+|V_y|)^2 + 6|V_y||V_y|} \right\}\end{aligned} \tag{51b}$$

$$\left( V_x^2+V_y^2+|V_xV_y| \geqq \frac{I_0}{2\beta} \geqq V_x^2+V_y^2-\frac{5}{3}|V_xV_y| \right)$$

$$\begin{aligned}\Delta I &= (I_L - I_R) = (I_{D1}+I_{D2}) - (I_{D5}+I_{D4}) \\ &= \left( \beta V_y\sqrt{\frac{I_0}{\beta} - V_y^2} \right)\mathrm{sgn}(V_x)\end{aligned} \tag{51c}$$

$$\left( V_x^2+V_y^2-\frac{5}{3}|V_xV_y| \geqq \frac{I_0}{2\beta} \right)$$

The equations (51a), (51b) and (51c) are the same as those of the multiplier core circuit of FIG. 3 proposed by Bult and Wallinga and those of the multiplier core circuit of FIG. 5 originally developed by Bult and reproposed by Wang.

Therefore, the MOS multiplier core circuit of the fourth embodiment in FIG. 22 can provide an ideal multiplier characteristic within the ranges where none of the MOSFETs M1, M2, M3 and M4 are cut off, in other words, within the input voltage ranges shown in the equation (51a).

However, as the input voltages $V_x$ and $V_y$ to be multiplied increase, the MOSFETs M1, M2, M3 and M4 start to be cut off, resulting in deviation from the ideal multiplier characteristic.

Figure 23:
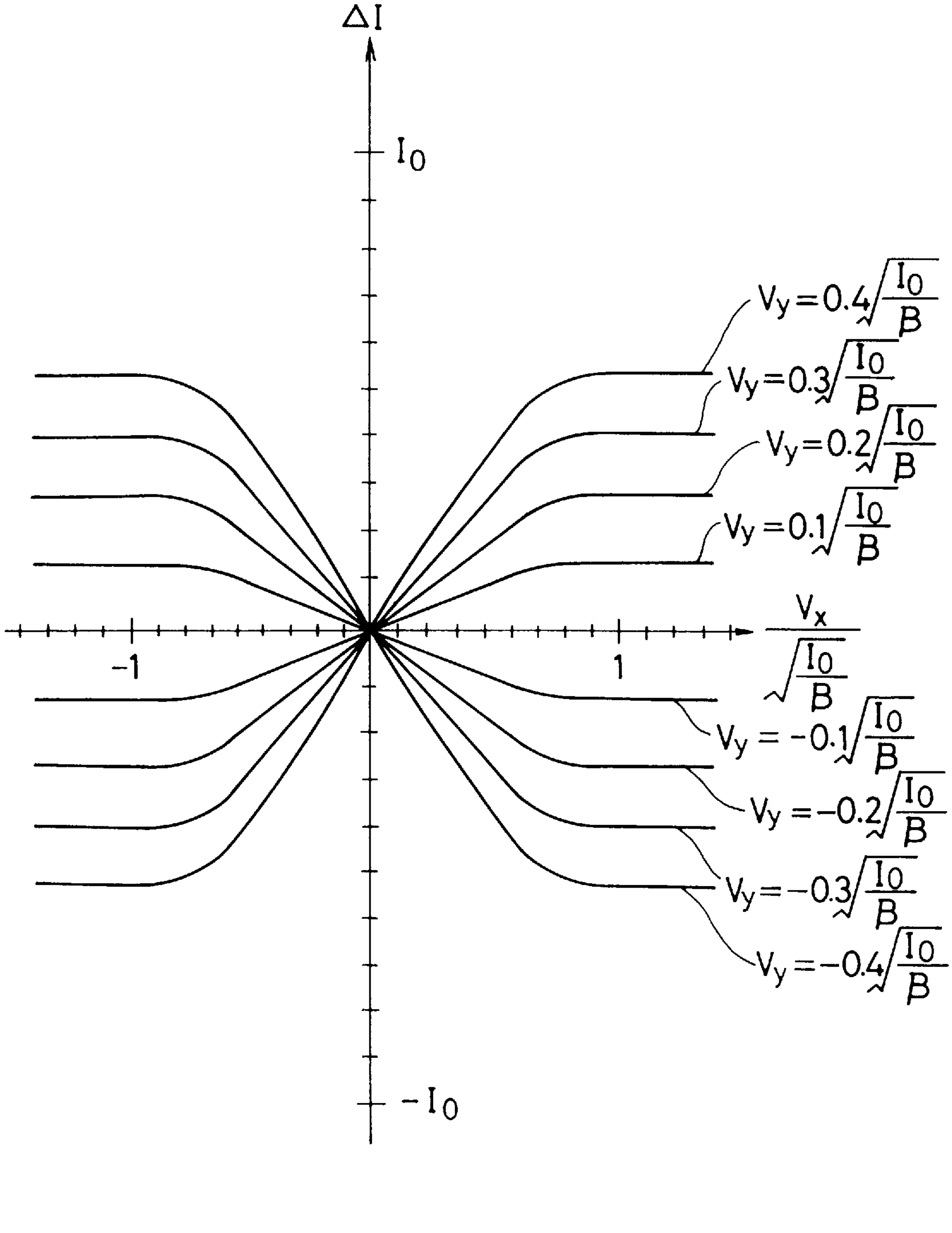
FIG. 23 shows the transfer characteristic of the multiplier core circuit of FIG. 22.

FIG. 23 shows the transfer characteristic of the multiplier core circuit of the fourth embodiment with the input voltage $V_y$ as a parameter, which is obtained by the equations (51a), (51b) and (51c). It is seen from FIG. 23 that this circuit has a limiting characteristic caused by the tail current $I_0$ for large input voltages.

The transconductance of the multiplier core circuit of FIG. 22 is given by differentiating the equations (51a), (51b) and (51c) by the input voltage $V_x$ or $V_y$. The following equations (52a), (52b) and (52c) are obtained by differentiating the equations (51a), (51b) and (51c) by the input voltage $V_x$.

$$\frac{d(\Delta I)}{dV_x} = 2\beta V_y \tag{52a}$$

$$\left( V_x^2+V_y^2+|V_xV_y| \leqq \frac{I_0}{2\beta} \right)$$

$$\frac{d(\Delta I)}{dV_x} = \frac{4}{3}\beta V_y - \frac{4}{9}\,\mathrm{sgn}(V_xV_y)\left\{ (|V_x|+|V_y|) - 2\beta\sqrt{-\frac{3I_0}{\beta} - 2(|V_x|+|V_y|)^2 + 6V_xV_y} + \frac{4\beta(|V_x|+|V_y|)^2}{\sqrt{\frac{3I_0}{\beta} - 2(|V_x|+|V_y|)^2 + 6V_xV_y}} \right\} \tag{52b}$$

$$\left( V_x^2+V_y^2+|V_xV_y| \geqq \frac{I_0}{2\beta} \geqq V_x^2+V_y^2-\frac{5}{3}|V_xV_y| \right)$$

$$\frac{d(\Delta I)}{dV_x} = 0 \tag{52c}$$

$$\left( V_x^2+V_y^2-\frac{5}{3}|V_xV_y| \geqq \frac{I_0}{2\beta} \right)$$

Figure 24:
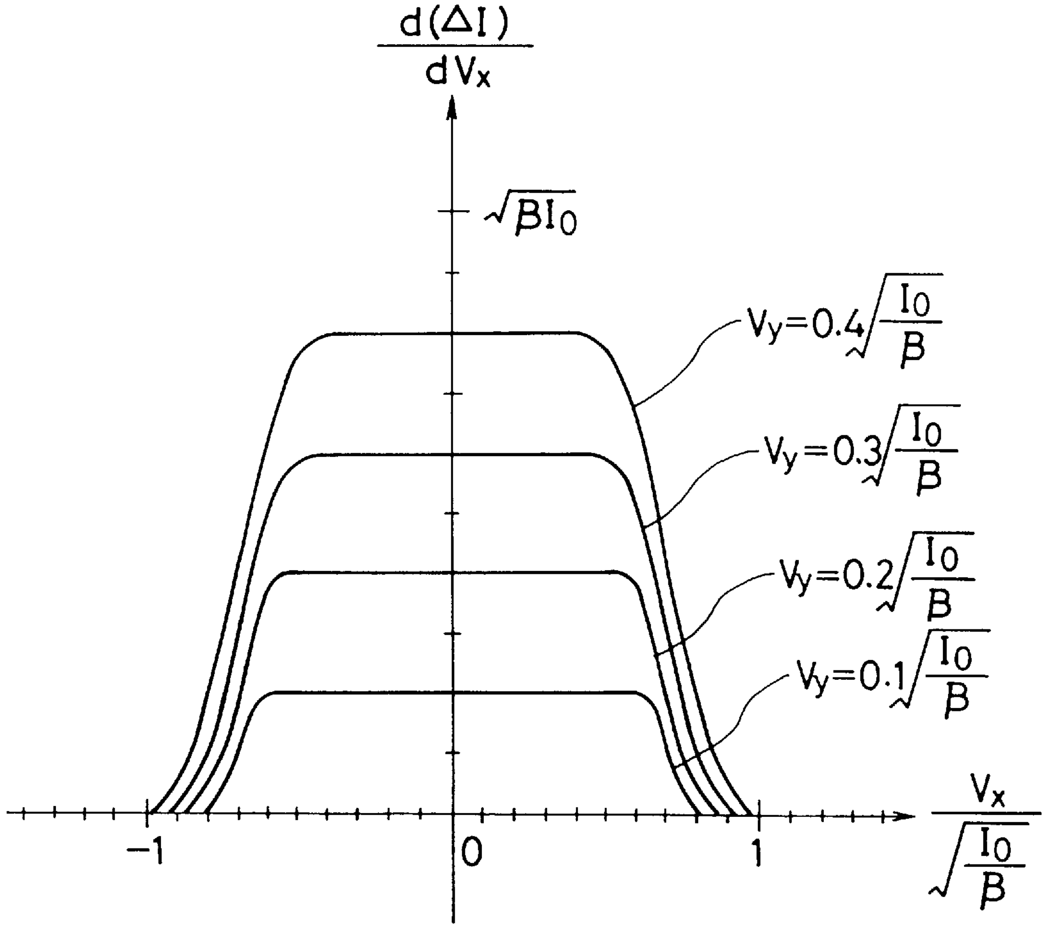
FIG. 24 shows the transconductance characteristic of the multiplier core circuit of FIG. 22.

FIG. 24 shows the transconductance characteristic of the multiplier core circuit of the fourth embodiment with the input voltage $V_y$ as a parameter, which is obtained from the equations (52a), (52b) and (52c).

It is seen from FIG. 24 that the transconductance characteristic is perfectly flat within the specified range of the input voltage $V_x$, which means that the circuit has a linear relationship between the input voltages and output current. Also, it is seen that the same transconductance characteristic is obtained for the two input voltages $V_x$ and $V_y$.

As described above, with the multiplier core circuit of the fourth embodiment, the input voltages for the first to fourth MOSFETs M1, M2, M3 and M4 are $V_x$–$V_y$), $2V_x$, $V_x$ and ($2V_x$–$V_y$), respectively, and therefore, the linear multiplier characteristic and low supply-voltage operation can be obtained independent of the threshold voltage.

Also, the input subcircuit for converting the two input voltages $V_x$ and $V_y$ to be multiplied into four voltages ($V_x$–$V_y$), $2V_x$, $V_x$ and ($2V_x$–$V_y$), respectively can be small in scale.

Since the first to fourth MOSFETs M1, M2, M3 and M4 are driven by the common tail current $I_0$, this core circuit has floating inputs and a limiting characteristic, and therefore, it is preferable for LSIs.

Further, this core circuit can be fabricated through the CMOS processes.

Figure 25:
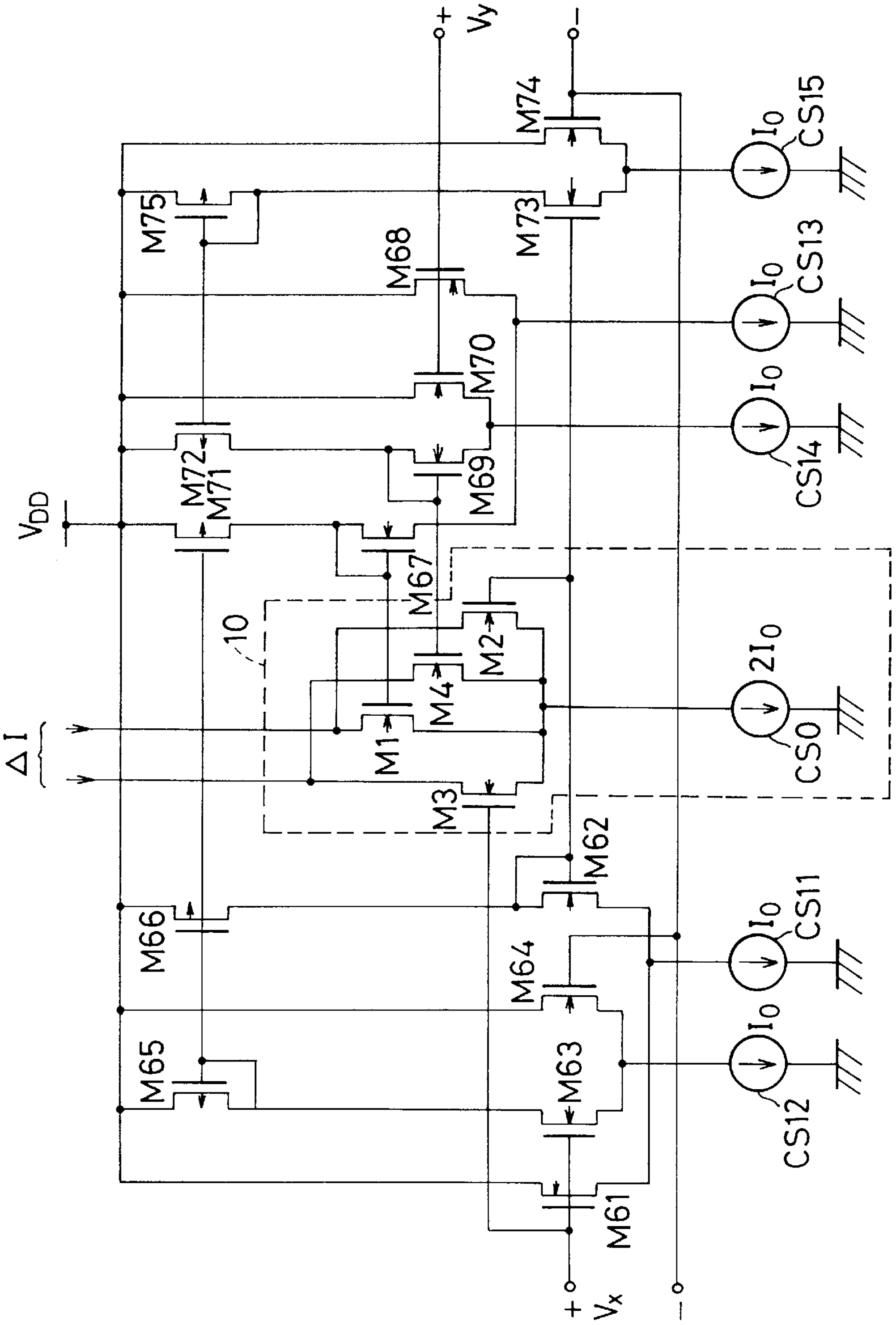
FIG. 25 is a circuit diagram showing an MOS analog multiplier including the multiplier core circuit of FIG. 22.

FIG. 25 shows a four-quadrant CMOS analog multiplier using the multiplier core circuit of FIG. 22. In FIG. 25, a subcircuit 10 form a multiplier core circuit according to the fourth embodiment of FIG. 22, in which the common tail current by the constant current source CS0 is $2I_0$.

The input voltage $V_x$ is directly applied to the gate of the MOSFET M3 of the multiplier core circuit 10 in positive phase.

A pair of n-channel MOSFETs M61 and M62 is driven by a constant current source CS11 (current: $I_0$). A pair of n-channel MOSFETs M63 and M64 is driven by a constant current source CS12 (current: $I_0$).

The voltage $V_x$ applied across the gates of the MOSFETs M63 and M64 is transferred to the diode-connected n-channel MOSFET M62 through a current mirror made of p-channel MOSFETs M65 and M66. On the other hand, the voltage $V_x$ applied to the gate of the MOSFET M61 in positive phase is transferred to the MOSFET M62. Thus, the voltage $2V_x$ is applied to the gate of the MOSFETs M2 of the multiplier core circuit 10 in positive phase.

A pair of n-channel MOSFETs M67 and M68 is driven by a constant current source CS13 (current: $I_0$). A pair of n-channel MOSFETs M69 and M70 is driven by a constant current source CS14 (current: $I_0$). A pair of n-channel MOSFETs M73 and M74 is driven by a constant current source CS15 (current: $I_0$).

The voltage $V_y$ is applied across the gates of the MOSFETs M68 and M74. The voltage $V_y$ is further applied to the gate of the MOSFET 70 in positive phase and to the gate of the MOSFET M64 in negative phase.

The voltage $V_x$ applied across the gates of the MOSFETs M63 and M64 is transferred to the MOSFET M67 in positive phase through the current mirror formed of the MOSFETs M65 and M66 and the MOSFET M71. On the other hand, the voltage $V_y$ applied to the gate of the MOSFET M68 in positive phase is transferred to the MOSFET M67. Thus, the voltage $(V_x-V_y)$ is produced at the MOSFET M67 to be applied to the gate of the MOSFET M1 of the multiplier core circuit 10.

A first current corresponding to the voltage $2V_x$ applied to the gate of the MOSFET M2 is transferred to the MOSFETs M73, M75 and M72 to the diode-connected MOSFET M69. A second current corresponding to the voltage applied to the gate of the MOSFET M70, i.e., $V_y$ is subtracted from the first current, and then, a voltage $(2V_x-V_y)$ corresponding to the difference current is generated at the gate of the MOSFET M67. The gate voltage $(2V_x-V_y)$ is applied to the gate of the MOSFET M4 of the multiplier core circuit 10.

Thus, the gates of the MOSFETs M1, M2, M3 and M4 are applied with the voltage $(V_x-V_y)$, $2V_x$, $V_x$ and $(2V_x-V_y)$, respectively.

Figure 26:
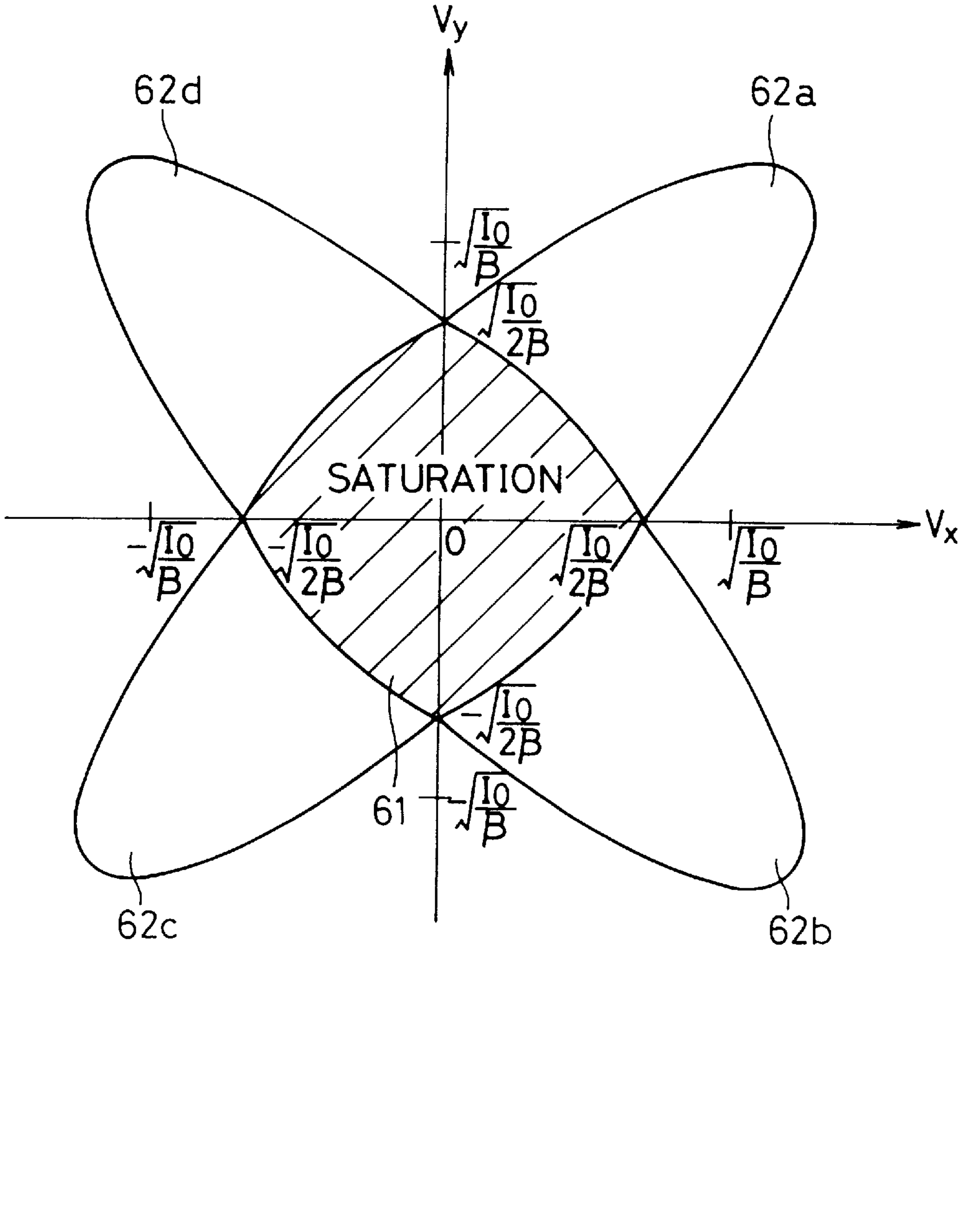
FIG. 26 shows the relationship between the input voltage ranges of $V_x$ and $V_y$ and the operating situations of the MOSFETs according to the multiplier core circuit of FIG. 22.

FIG. 26 shows the operating regions for the input voltages $V_x$ and $V_y$ of the multiplier core circuit of the fourth embodiment. In FIG. 26, the central hatched area 61 of a diamond shape denotes the normally operating region that provides the ideal multiplier characteristic and that corresponds to the equation (51a). Four protruding areas 62*a*, 62*b*, 62*c* and 62*d* from the area 61 denote the abnormally operating region that corresponds to the equation (51b). The remaining area denotes the non-operating region that corresponds to the equation (51c).

Figure 27:
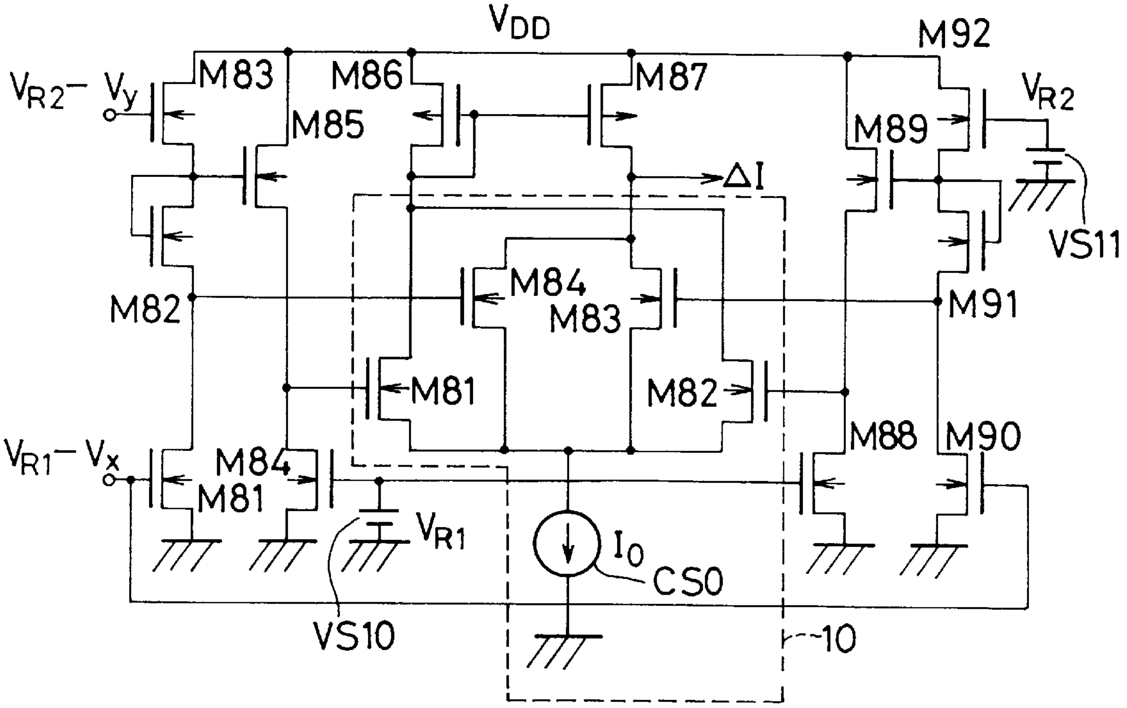
FIG. 27 is a circuit diagram showing another MOS analog multiplier including the multiplier core circuit of FIG. 22.

FIG. 27 shows another four-quadrant analog multiplier using the multiplier core circuit of FIG. 22, in which cascoded MOSFETs whose sources are grounded are employed as the input subcircuit.

In FIG. 27, the subcircuit 10 forms the multiplier core circuit according to the fourth embodiment. MOSFETs M86 and M87 are an active load of the core circuit.

Four n-channel MOSFETs M81, M84, M88 and M90 have grounded sources. Gates of the MOSFETs M81 and M90 are coupled together. A voltage source VS10 (voltage: $V_{R1}$) is connected between coupled gates of MOSFETs M84 and M88 and the ground.

The n-channel MOSFETs M81, M82 and M83 are double-cascoded. The n-channel MOSFETs M84 and M85 are cascoded. The n-channel MOSFETs M88 and M89 are cascoded. The n-channel MOSFETs M90, M91 and M92 are double-cascoded. A voltage source VS11 (voltage: $V_{R2}$) is connected between the gate of MOSFET M92 and the ground.

A voltage $(V_{R1}-V_x)$ is applied across the gates of the MOSFETs M81 and M90. A voltage $(V_{R2}-V_y)$ is applied to the gate of the MOSFET M83. The constant dc voltage $V_{R1}$ is applied to the gates of the MOSFETs M84 and M8e. The constant do voltage $V_{R2}$ is applied to the gate of the MOSFET M92.

Using the cascoded subcircuits, The gate of the MOSFET M1 is applied with a voltage $[-V_{Rx}+(½)V_y]$. The gate of the MOSFET M2 is applied with a voltage $(V_{Rx}+V_y)$. The gate of the MOSFET M3 is applied with a voltage $(-V_{Rx}+V_y)$. The gate of the MOSFET M4 is applied with a voltage $[V_{Rx}+(½)V_y]$.

With the MOS multiplier shown in FIG. 27, since the cascoded MOSFETs are driven by a current and have floating inputs, the multiplier circuit of FIG. 27 operate differentially. Therefore, the four input voltages are the same in those of the reproposed by Wang.

Compared with the cases of Bult and Wallinga, the multiplier core circuit of FIG. 27 reduces the necessary number of MOSFETs.

Further, this circuit is operable at a low supply voltage.

Fifth Embodiment

Figure 28:
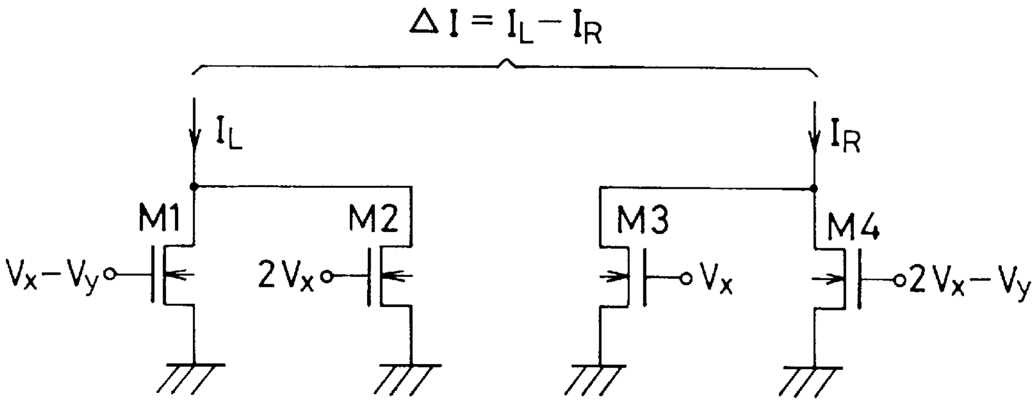
FIG. 28 is a circuit diagram showing a multiplier core circuit according to a fifth embodiment of the present invention, which contains the grounded sources of the MOSFETs.

FIG. 28 shows a four-quadrant multiplier core circuit according to a fifth embodiment of the present invention, which is composed of MOSFETs.

The circuit of the fifth embodiment has the same configuration as that of the fourth embodiment except that no constant current source is provided and that the sources of the MOSFETs M1, M2, M3 and M4 are directly grounded.

Because the four input voltages $V_1$, $V_2$, $V_3$ and $V_4$ are the same as those in the fourth embodiment of FIG. 22, the drain currents of the respective MOSFETs M1, M2, M3 and M4 can be expressed by the following equations (53), (54), (55) and (56), respectively.

$$I_{D1}=\beta(V_x-V_y+V_R-V_{TH})^2 \quad (53)$$

$$I_{D2}=\beta(2V_x+V_R-V_{TH})^2 \quad (54)$$

$$I_{D3}=\beta(V_x+V_R-V_{TH})^2 \quad (55)$$

$$I_{D4}=\beta(2V_x-V_y+V_R-V_{TH})^2 \quad (56)$$

The differential output current $\Delta I$ of the fifth embodiment is expressed by the following equations (57a), (57b), (57c), (57d), (57e) and (57f).

$$\begin{aligned}\Delta I &= I_L-I_R=(I_{D1}+I_{D2})-(I_{D3}+I_{D4}) \\ &= 2\beta V_xV_y \\ &\quad (M_1, M_2, M_3, M_4\text{: saturation})\end{aligned} \quad (57a)$$

$$\begin{aligned}\Delta I &= I_L-I_R=(I_{D1}+I_{D2})-(I_{D3}+I_{D4}) \\ &= 2\beta V_xV_y-\beta(V_x-V_y+V_R-V_{TH})^2 \\ &\quad (M_1\text{: cutoff})\end{aligned} \quad (57b)$$

$$\begin{aligned}\Delta I &= I_L-I_R=(I_{D1}+I_{D2})-(I_{D3}+I_{D4}) \\ &= 2\beta V_xV_y-\beta(2V_x-V_y+V_R-V_{TH})^2 \\ &\quad (M_4\text{: cutoff})\end{aligned} \quad (57c)$$

$$\begin{aligned}\Delta I &= I_L-I_R=(I_{D1}+I_{D2})-(I_{D3}+I_{D4}) \\ &= 2\beta V_xV_y-\beta(V_x+V_R-V_{TH})^2 \\ &\quad (M_3\text{: cutoff})\end{aligned} \quad (57d)$$

$$\begin{aligned}\Delta I &= I_L-I_R=(I_{D1}+I_{D2})-(I_{D3}+I_{D4}) \\ &= 3\beta V_x^2+2\beta V_x(V_R-V_{TH}) \\ &\quad (M_1, M_4\text{: cutoff})\end{aligned} \quad (57e)$$

$$\begin{aligned}\Delta I &= I_L-I_R=(I_{D1}+I_{D2})-(I_{D3}+I_{D4}) \\ &= -\beta(V_x-V_y)\{3V_x-V_y+2(V_R-V_{TH})\} \\ &\quad (M_1, M_3\text{: cutoff})\end{aligned} \quad (57f)$$

-continued $$\Delta I = I_L - I_R = (I_{D1} + I_{D2}) - (I_{D3} + I_{D4}) \qquad (57g)$$
$$= \beta(2V_x + V_R - V_{TH})^2$$
$$(M_1, M_4, M_3\text{: cutoff})$$

With the multiplier core circuit of FIG. 28 according to the fifth embodiment, the cut-off conditions of MOSFETs M1, M2, M3 and M4 are different from each other in each quadrant of $V_x$ and $V_y$. In the first quadrant where $V_x \geqq 0$ and $V_y \geqq 0$, no MOSFETs M1, M2, M3 and M4 are cut off. The dc voltages $V_R$ contained in the input voltages $V_x$ and $V_y$ can be optionally decided. The four input voltages applied to the respective MOSFETs M1, M2, M3 and M4, i.e., $(V_x - V_y)$, $2V_x$, $V_x$ and $(2V_x - V_y)$, can be set within the no cut-off ranges by using attenuators. Therefore, it is seen from the equations (53), (54), (55), (56), (57a), (57b), (57c), (57d), (57e), (57f) and (57g) that no cut-off occurs for the MOSFETs M1, M2, M3 and M4 in the first to fourth quadrants if the input voltage ranges are set to satisfy the relationship $|V_x| + |V_y| \leqq V_R - V_{TH}$.

The equation (57a) expresses the differential output current in the no cut-off region of the MOSFETs M1, M2, M3 and M4, which is perfectly linear. In other words, the multiplier core circuit of FIG. 28 can provide the ideal multiplication characteristic in the regions.

Figure 29:
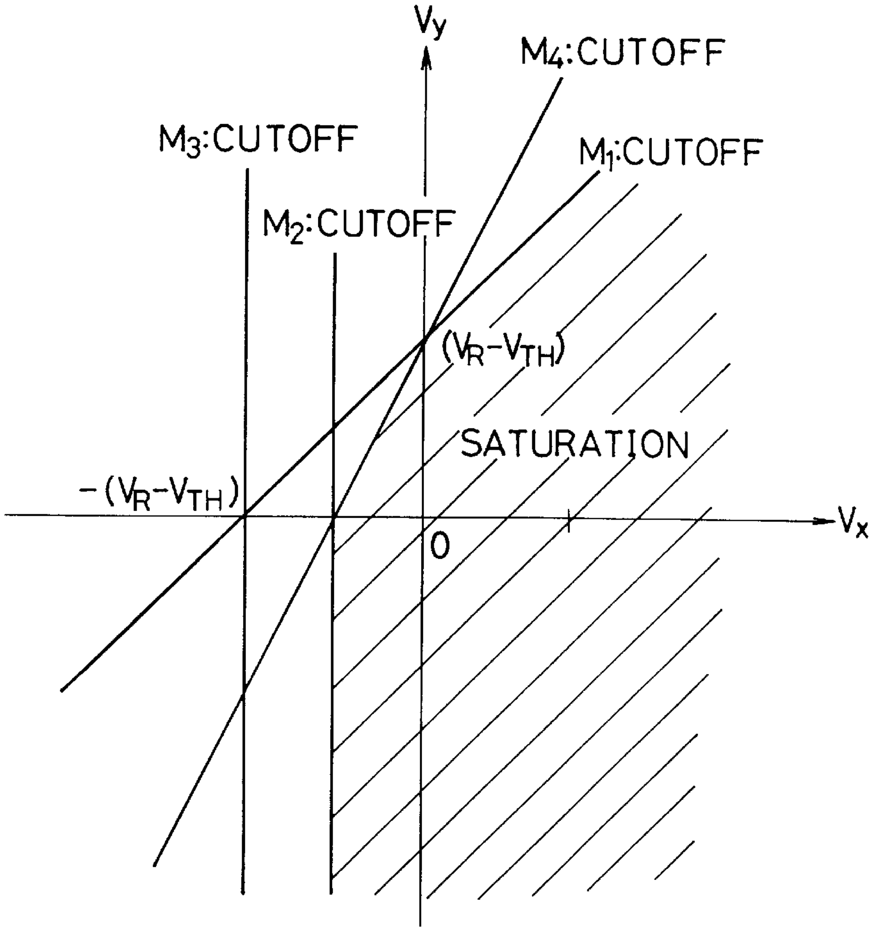
FIG. 29 shows the relationship between the input voltage ranges of $V_x$ and $V_y$ and the operating situations of the MOSFETs according to the multiplier core circuit of FIG. 28.

FIG. 29 shows the cut-off and saturation regions for the MOSFETs M1, M2, M3 and M4 with respect to $V_x$ and $V_y$. The hatched area indicates the saturation region where the relationship $|V_x| + |V_y| \leqq (½)(V_R - V_{TH})$ is established. As $V_x$ and $V_y$ increase, at least one of the MOSFETs M1, M2, M3 and M4 will cut off to deviate from the ideal multiplier characteristic.

If the above equation (57a) indicating the differential output current ΔI within the no cut-off ranges is differentiated by $V_x$ and $V_y$, the transconductance is obtained by the following equations (58a) and (58b).

$$\frac{d(\Delta I)}{dV_x} = 2\beta V_y \qquad (58a)$$

$$\frac{d(\Delta I)}{dV_y} = 2\beta V_x \qquad (58b)$$

It is seen from the equations (58a) and (58b) that the multiplier core circuit of FIG. 28 has the same transconductance characteristic for $V_x$ and $V_y$.

With the multiplier core circuit of FIG. 28, since no constant current source for driving the MOSFETs M1, M2, M3 and M4 is required, this core circuit can be reduced in circuit scale and be enlarged in the input voltage ranges.

Sixth Embodiment

Figure 30:
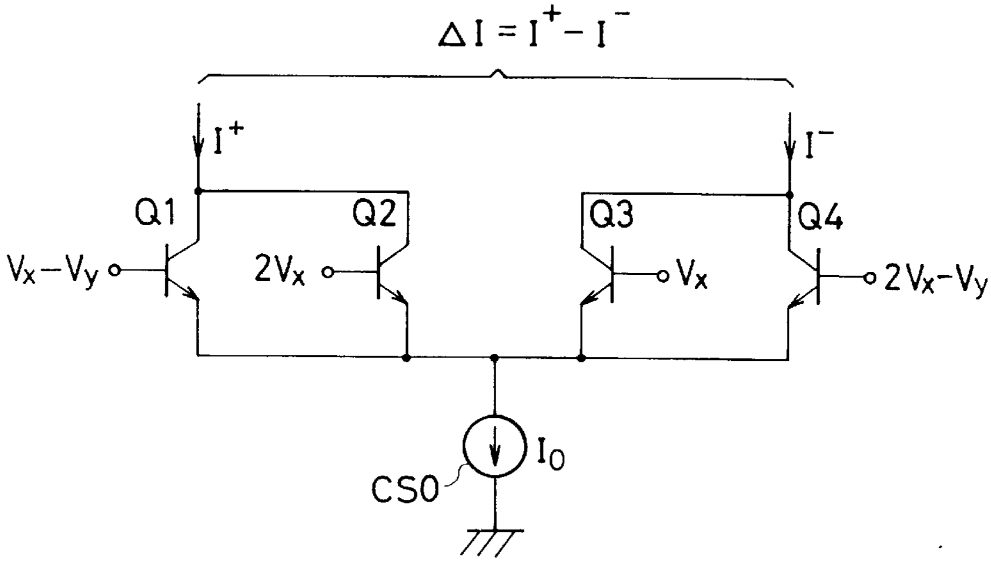
FIG. 30 is a circuit diagram showing a bipolar multiplier core circuit according to a sixth embodiment of the present invention, which contains a quadritail cell.

FIG. 30 shows a four-quadrant multiplier core circuit according to a sixth embodiment of the present invention, which is equivalent to a multiplier core circuit that is obtained by replacing the MOSFETs M1, M2, M3 and M4 in FIG. 22 of the fourth embodiment by bipolar transistors Q1, Q2, Q3 and Q4.

Specifically, as shown in FIG. 30, this circuit has a quadritail cell formed of first to fourth npn-type bipolar transistors Q1, Q2, Q3 and Q4 and a constant current source CS0 (current: $I_0$) for driving the quadritail cell. The transistors Q1, Q2, Q3 and Q4 have the same emitter area.

Emitters of the first to fourth transistors Q1, Q2, Q3 and Q4 are coupled together. The constant current source CS0 is connected to the coupled emitters and the ground, respectively. In other words, these transistors Q1, Q2, Q3 and Q4 are grounded through the current source CS0.s Collectors of the first and second transistors Q1 and Q2 are coupled together. An output current $I^+$, which is equal to the sum of the collector currents of the transistors Q1 and Q2, is taken out from the coupled collectors of the transistors Q1 and Q2.

Collectors of the third and fourth transistors Q3 and Q4 are coupled together. Another output current $I^-$, which is equal to the sum of the collector currents of the transistors Q3 and Q4, is taken out from the coupled collectors of the transistors Q3 and Q4.

A differential output current ΔI of the multiplier core circuit is defined as the difference of the currents $I^+$ and $I^-$, i.e., $\Delta I = I^+ - I^-$.

A base of the first transistor Q1 is applied with a voltage $(V_x - V_y)$ A base of the second transistor Q2 is applied with a voltage $2V_x$. A base of the third transistor Q3 is applied with a voltage $V_x$. A base of the fourth transistor Q4 is applied with a voltage $(2V_x - V_y)$.

The differential output current ΔI of this bipolar multiplier core circuit is given from the equation (19) as the following equation (59).

$$\Delta I = \alpha_F I_0 \tanh\left(\frac{V_x}{2V_T}\right)\tanh\left(\frac{V_y}{2V_T}\right) \qquad (59)$$

The equation (59) is the same as the above equations (20) and (22). The right-hand side of the equation (59) multiplied by $\alpha_F$ is equal to the differential output current of the well-known Gilbert multiplier cell.

As described previously, since an obtainable value of $\alpha_F$ through the typical bipolar processes is extremely near 1, the multiplier core circuit of the sixth embodiment has the transfer characteristic approximately equal to that of the Gilbert multiplier cell. Also, this multiplier core circuit can operate at a lower supply voltage than the Gilbert multiplier cell.

Figure 31:
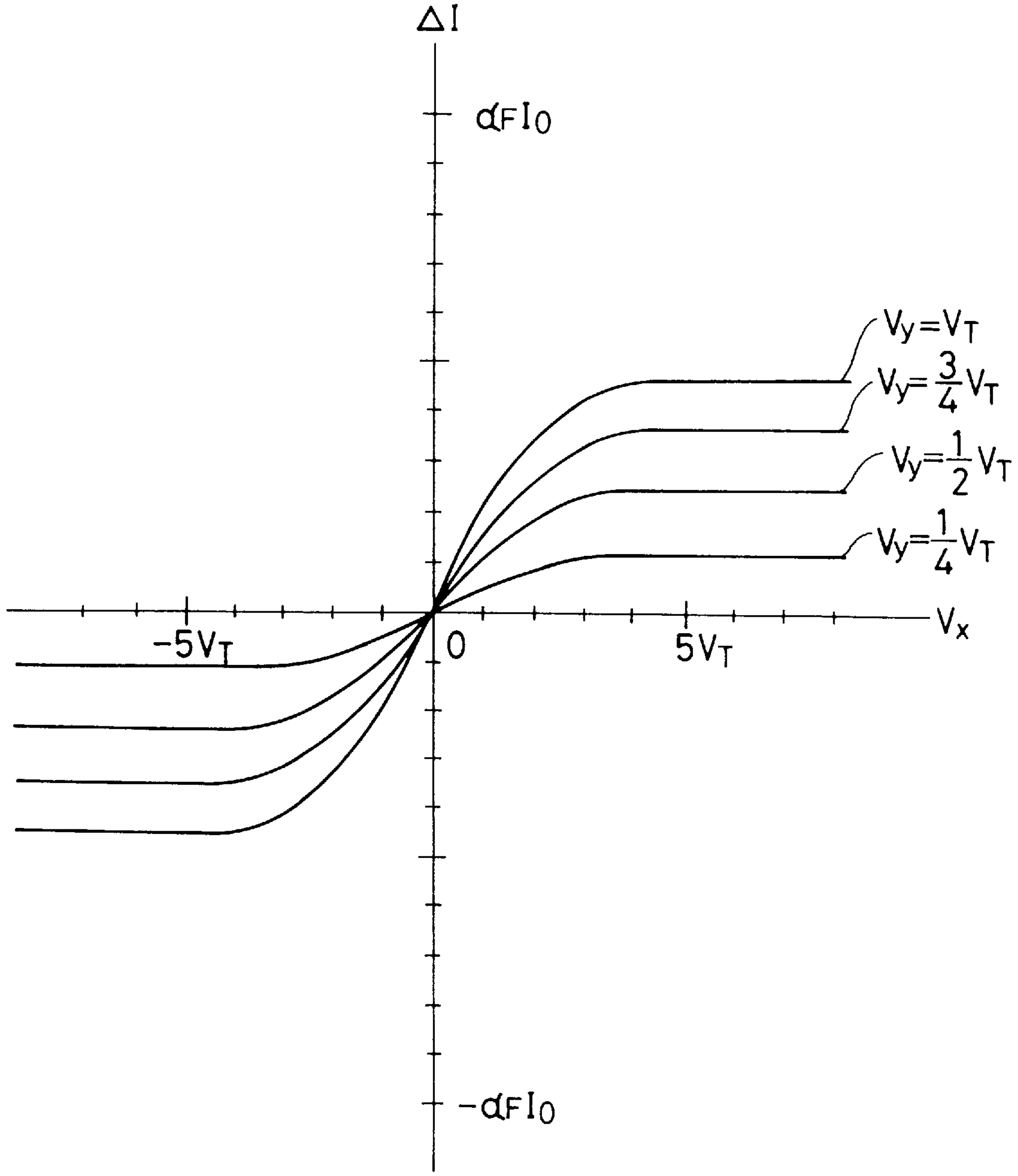
FIG. 31 shows the transfer characteristic of the multiplier core circuit of FIG. 30.

FIG. 31 shows the transfer characteristic of the bipolar multiplier core circuit of the sixth embodiment with the input voltage $V_y$ as a parameter, which is obtained by the equation (59). It is seen from FIG. 31 that the characteristic is approximately linear within the range of $|V_x| \leqq VT$ and that the circuit has a limiting characteristic caused by the tail current $I_0$ for large input voltages.

Figure 32:
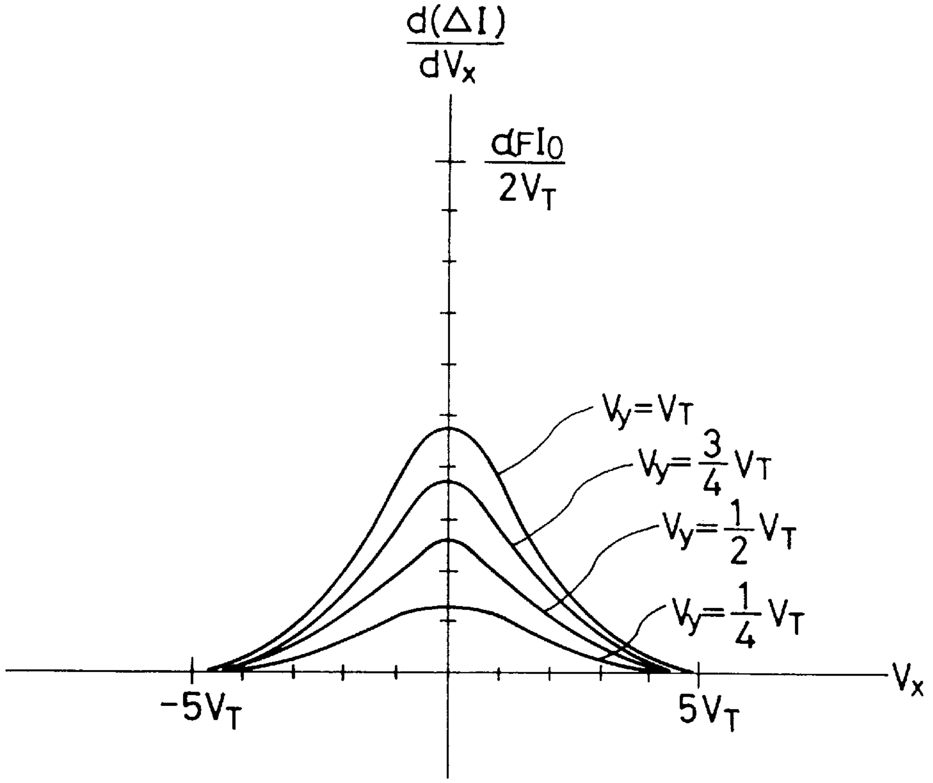
FIG. 32 shows the transconductance characteristic of the multiplier core circuit of FIG. 30.

FIG. 32 shows the transconductance characteristic of the multiplier core circuit of the third embodiment, which is given by differentiating the equation (59) by the voltage $V_x$ with the voltage $V_y$ as a parameter. It is seen from FIG. 32 that the transconductance characteristic is approximately flat within the range of $|V_x| = 0$ that provides the approximately linear multiplier characteristic and that no perfectly linear characteristic as that in the MOS multiplier core circuit of the first and second embodiments.

If the transistors Q1, Q2, Q3 and Q4 are directly grounded by removing the constant current source CS0 as shown in FIG. 28, the differential output current ΔI is given by the following equation (60).

$$\Delta I = 4I_o \exp\left(\frac{3V_x}{2V_T}\right)\exp\left(-\frac{V_y}{2V_T}\right)\sinh\left(\frac{V_x}{2V_T}\right)\sinh\left(\frac{V_y}{4V_T}\right) \qquad (60)$$

As seen from the equation (60), also in this case, the transfer characteristic cannot be said as the multiplier characteristic. This means that the first to fourth transistors Q1, Q2, Q3 and Q4 should be driven by a constant current source to realize a bipolar multiplier core circuit.

Seventh Embodiment

As already described above relating to FIG. 21, in order to realize a multiplier characteristic for the input voltages $V_x$ and $V_y$ to be multiplied, the four input voltages $V_1$, $V_2$, $V_3$ and $V_4$ applied to the respective MOSFETs M1, M2, M3 and M4 or respective bipolar transistors Q1, Q2, Q3 and Q4 can be defined by the above equations (40a), (40b), (40c) and (40d).

Further, in the right-hand sides of the equations (40a), (40b), (40c) and (40d), the terms including negative coefficients need to be produced by active circuit elements such as MOSFETs or bipolar transistors. However, if the parameters a, b and c satisfy the relationships of $a \geqq c$ and $b \geqq (1/c)$, the coefficients for the voltages $V_x$ and $V_y$ are positive. Accordingly, the four voltages $V_1$, $V_2$, $V_3$ and $V_4$ can be realized through the summation of $V_x$ and $V_y$, which enables simplification of the input circuit configuration because the voltages $V_1$, $V_2$, $V_3$ and $V_4$ can be realized by using a resistor-dividing circuit or circuits.

Figure 33:
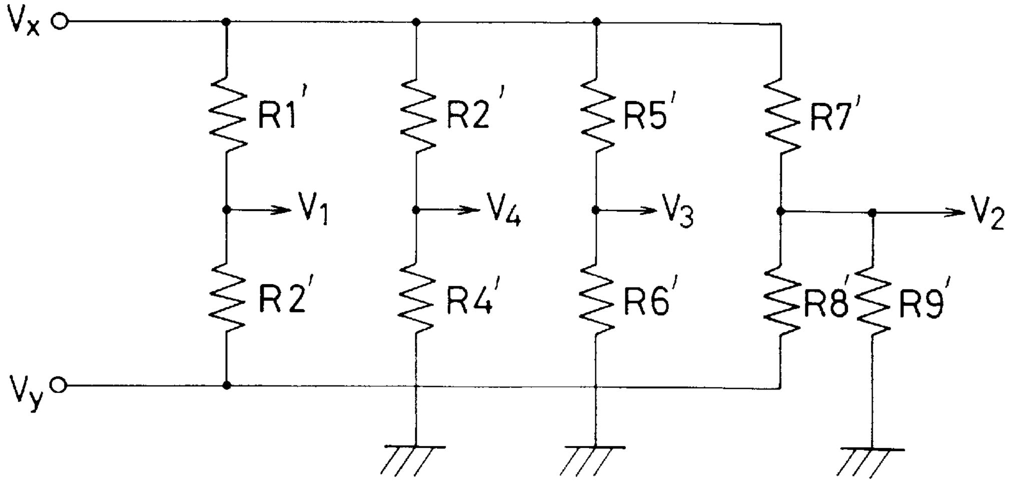
FIG. 33 is a circuit diagram showing an input subcircuit for producing the input signal voltages to the first to fourth transistors according to the invention, which includes voltage dividers using resistors.

FIG. 33 schematically shows an input circuit for the multiplier core circuit of the invention, in which the voltages $V_1$, $V_2$, $V_3$ and $V_4$ are produced from the voltages $V_x$ and $V_y$ using dividing resistors.

In FIG. 33, the voltages $V_x$ and $V_y$ are divided by using resistors R1', R2', R3', R4, R5', R6', R7', R8' and R9', respectively. The resistance ratios of these resistors are defined corresponding to specified dividing factors.

For example, when a=2, b=1, and c=1, the voltages $V_1$, $V_2$, $V_3$ and $V_4$ are expressed as the following equations (61a), (61b), (61c) and (61d), respectively.

$$V_1=2V_x+V_y \tag{61a}$$

$$V_2=V_x \tag{61b}$$

$$V_3=V_x+V_y \tag{61c}$$

$$V_4=2V_x \tag{61d}$$

Here, if $2V_x$ is replaced with $V_x$, the equations (61a), (61b), (61c) and (61d) become as follows.

$$V_1 = V_x + V_y \tag{62a}$$

$$V_2 = \frac{V_x}{2} \tag{62b}$$

$$V_3 = \frac{V_x}{2} + V_y \tag{62c}$$

$$V_4 = V_x \tag{62d}$$

The relationship between the voltages $V_1$, $V_2$, $V_3$ and $V_4$ are the same if the right-hand sides of the equations (62a), (62b), (62c) and (62d) are divided by two. Therefore, the equations (62a), (62b), (62c) and (62d) can be changed to the following equations (63a), (63b), (63c) and (63d), respectively.

$$V_1 = \frac{V_x + V_y}{2} \tag{63a}$$

$$V_2 = \frac{V_x}{4} \tag{63b}$$

$$V_3 = \frac{1}{2}\left(\frac{V_x}{2} + V_y\right) \tag{63c}$$

$$V_4 = \frac{V_x}{2} \tag{63d}$$

Figure 34:
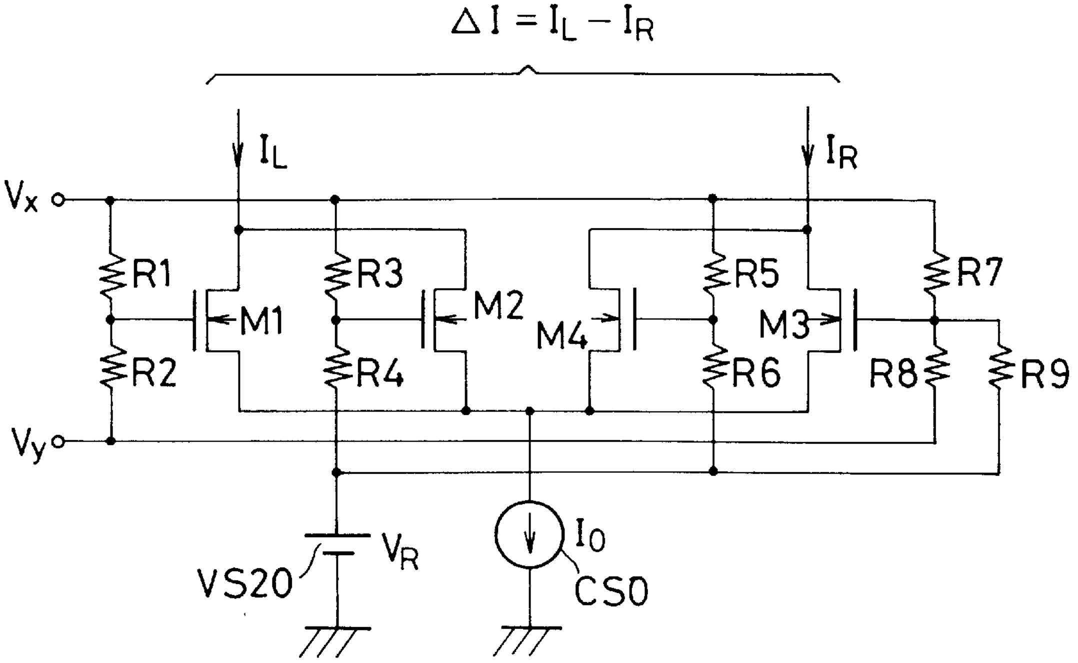
FIG. 34 is a circuit diagram showing an MOS analog multiplier including voltage dividers using resistors.

FIG. 34 shows an analog multiplier using the MOS multiplier core circuit according to the invention and the basic input-circuit configuration in FIG. 33, in which the input circuit is obtained by resistor-dividing subcircuits.

In FIG, 34, the first input voltage $V_1$ to be applied to the gate of the first MOSFET M1 is a voltage given by dividing the resistors R1 and R2. The resistors R1 and R2 have the same resistance r and therefore, $V_1=(½)(V_x+V_y)$.

The second input voltage $V_2$ to be applied to the gate of the second MOSFET M2 is a voltage given by dividing the resistors R3 and R4. The resistors R3 and R4 have the resistances r and (r/3), respectively, and therefore, $V_2=(¼)V_x$.

The third input voltage $V_3$ to be applied to the gate of the third MOSFET M3 is a voltage given by dividing the resistors R7, R8 and R9. The resistors R7, R8 and R9 have the resistances r, (r/2) and r, respectively, and therefore, $V_3=(½)[(½)V_x+V_y]$.

The fourth input voltage $V_4$ to be applied to the gate of the fourth MOSFET M4 is a voltage given by dividing the resistors R5 and R6. The resistors R5 and R6 have the same resistances r and therefore, $V_4=(½)V_x$.

Thus, the input voltages $V_1$, $V_2$, $V_3$ and $V_4$ are given as $$V_1=(½)(V_x+V_y)$$

$$V_2=(¼)V_x$$

$$V_3=(½)[(½)V_x+V_y]$$

$$V_4=(½)V_x$$

Since these voltages $V_1$, $V_2$, $V_3$ and $V_4$ satisfy the above equations (63a), (63b), (63c) and (63d), respectively, it is seen that the circuit shown in FIG. 34 has a multiplier characteristic.

A voltage source VS20 for producing a dc offset voltage $V_R$ is used to raise the gate voltage of each MOSFET than its source voltage.

As described above, with the multiplier shown in FIG. 341 since all the right-hand sides of the above equations (63a), (63b), (63c) and (63d) are positive, the input circuit for the multiplier can be realized by only the resistors. As a result, the input circuit can be simplified.

Also, because the input circuit can be formed by the resistors, the multiplier of FIG. 34 is capable of low supply voltage operation due to no stacked transistors.

Figure 35:
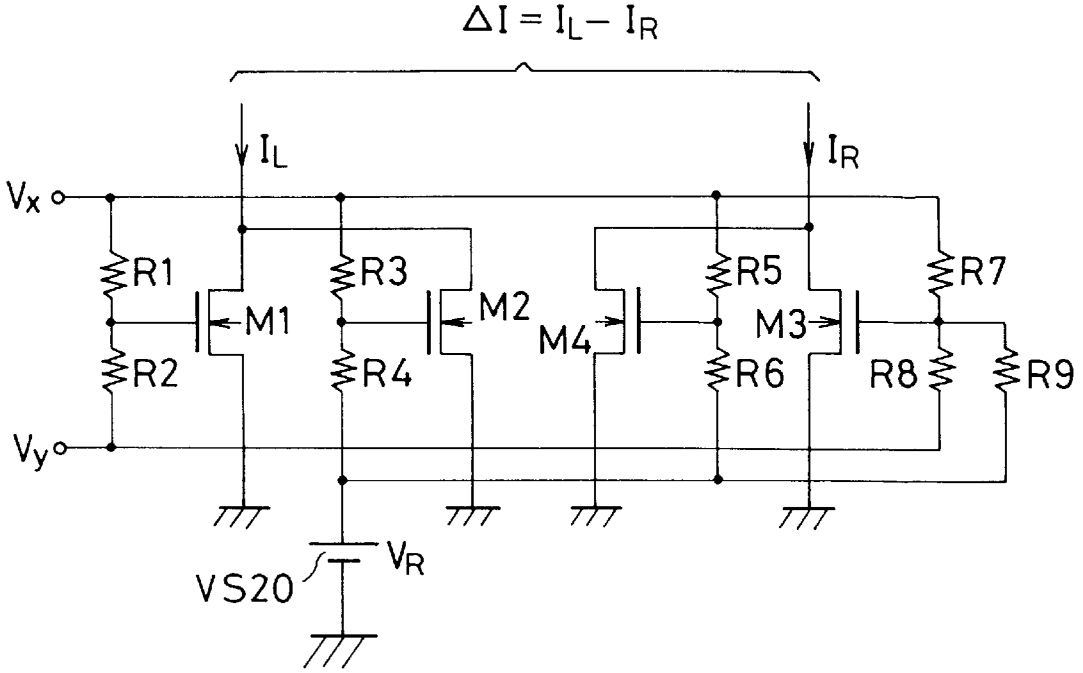
FIG. 35 is a circuit diagram showing another MOS analog multiplier including voltage dividers using resistors.

Although the MOS multiplier disclosed in FIG. 34 has a constant current source CS0, it is needless to say that the multiplier characteristic can be realized even if the current source CS0 is removed as shown in FIG. 35.

Figure 36:
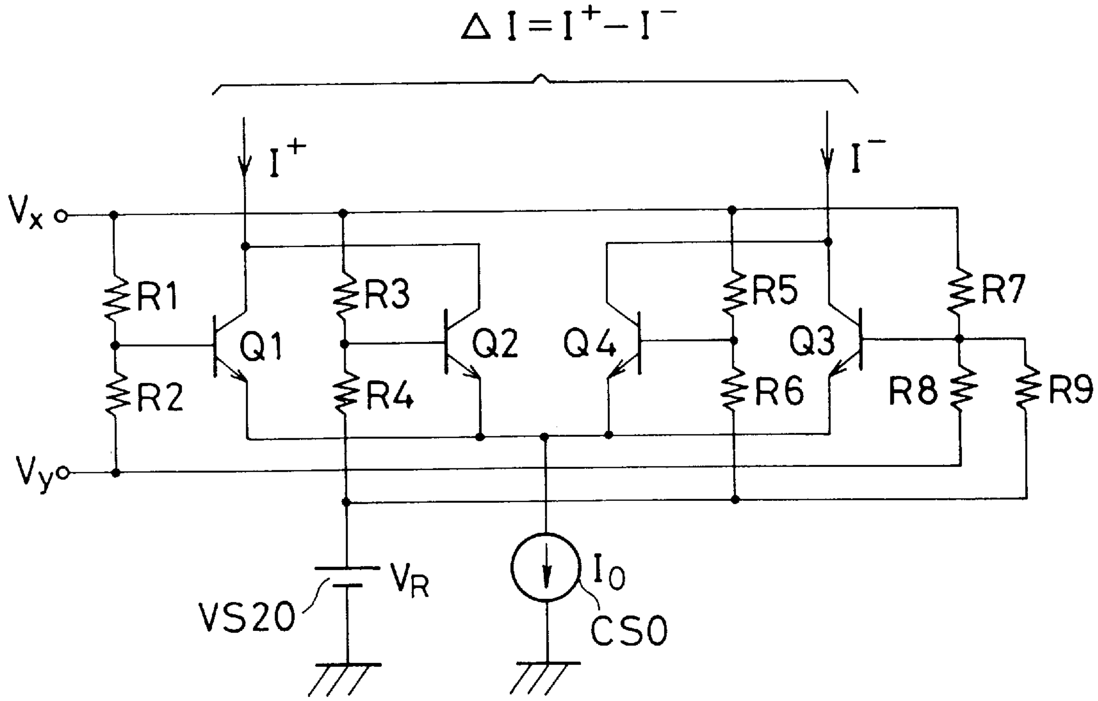
FIG. 36 is a circuit diagram showing a bipolar analog multiplier including voltage dividers using resistors.

Also, it is needless to say that the multiplier characteristic can be realized even if the MOSFETs are replaced with bipolar transistors, as shown in FIG. 36. In the bipolar case, if the four voltages $V_1$, $V_2$, $V_3$ and $V_4$ shown in the above equations (40a), (40b), (40c) and (40d) are substituted into the equation (19), the differential output current of the bipolar quadritail cell is expressed by the equation (38).

With the four-quadrant analog multipliers shown in FIGS. 34, 35 and 36, even if the polarity of the input voltages $V_x$ and $V_y$ are changed to opposite, i.e., $-V_x$ and $-V_y$, the polarity of the output $V_x V_y$ does not change. However, when either of the voltages $V_x$ and $V_y$ is changed, the polarity of the differential output current $\Delta I$ ($=I_L-I_R$, or $I^+-I^-$) is changed.

When the differential output current $\Delta I$ is defined as $\Delta I=I_R-I_L$ (or $I^--I^+$), not as $\Delta I=I_L-I_R$ (or $I^+-I^-$), even if either of the voltages $V_x$ and $V_y$ is changed in polarity, the same output current as that of the case where both of the voltages $V_x$ and $V_y$ are positive can be obtained.

Further, even if at least one of the input voltages $V_x$ and $V_y$ are divided into half in amplitude, respectively, the same multiplier characteristic can be obtained while the amplitude of the output current becomes a quarter Similarly, even if at least one of the input voltages $V_x$ and $V_y$ are divided by m in amplitude where m is a positive integer, respectively, the same multiplier characteristic can be obtained while the amplitude of the output current becomes 1/m.

Thus, it is clear that the circuits of FIGS. 34, 35 and 36 provide a multiplier characteristic.

In the above embodiments, the first to fourth MOSFETs have sources directly grounded, as shown in FIGS. 16, 28 and 35 because they are of an n-channel. However, when they are of a p-channel, their sources are directly connected to a voltage sources, in other words, their sources are directly applied with a supply voltage.

While the preferred forms., of the present invention have been described, it is to be understood that modifications will be apparent to those skilled in the art without departing from the spirit of the invention. The scope of the invention, therefore, is to be determined solely by the following claims.

What is claimed is:

1. A multiplier core circuit for multiplying a first input signal voltage $V_x$ and a second input signal voltage $V_y$, said circuit comprising:

first, second, third and fourth FETs whose sources are coupled together;

a current source for driving said first to fourth FETs by a common tail current;

drains of said first and second FETs being coupled together to form a first output;

drains of said third and fourth FETs being coupled together to form a second output;

a first voltage source of $(-V_x+(½)V_y)$ coupled to a gate of said first FET;

a second voltage source of $(V_x+V_y)$ coupled to a gate of said second FET;

a third voltage source of $(-V_x+V_y)$ coupled to a gate of the third FET;

a fourth voltage source of $(V_x+(½)V_y)$ coupled to a gate of the fourth FET;

an input subcircuit for producing said first, second, third, and fourth voltage sources from said first input signal voltage $V_x$ and said second input signal voltage $V_y$; and an output of said multiplier core circuit being defined as a difference between said first output and said second output.

2. A multiplier core circuit as claimed in claim 1, wherein said first, second, third and fourth voltage sources are produced by using voltage dividers each of which is made of at least one resistor.

3. A multiplier core circuit for multiplying a first input signal voltage $V_x$ and a second input signal voltage $V_y$, said circuit comprising:

first, second, third and fourth FETs whose sources are one of directly grounded and directly applied with a supply voltage;

drains of said first and second FETs being coupled together to form a first output;

drains of said third and fourth FETs being coupled together to form a second output;

a first voltage source of $(-V_x+(½)V_y)$ coupled to a gate of said first FET;

a second voltage source of $(V_x+V_y)$ coupled to a gate of said second FET;

a third voltage source of $(-V_x+V_y)$ coupled to a gate of said third FET;

a fourth voltage source of $(V_x+(½)V_y)$ coupled to a gate of said fourth FET;

an input subcircuit for producing said first, second, third, and fourth voltage sources from said first input signal voltage $V_x$ and said second input signal voltage $V_y$; and an output of said multiplier core circuit being defined as a difference between said first output and said second output.

4. A multiplier core circuit as claimed in claim 3, wherein said first, second, third and fourth voltage sources are produced by using voltage dividers each of which is made of at least one resistor.

5. A multiplier core circuit for multiplying a first input signal voltage $V_x$ and a second input signal voltage $V_y$, said circuit comprising:

first, second, third and fourth bipolar transistors whose emitters are coupled together;

a current source for driving said first to fourth bipolar transistors by a common tail current;

collectors of said first and second transistors being coupled together to form a first output;

collectors of said third and fourth transistors being coupled together to form a second output;

a first voltage source of $(-V_x+(½)V_y)$ coupled to a base of said first bipolar transistor;

a second voltage source of $(V_x+V_y)$ coupled to a base of said second bipolar transistor;

a third voltage source of $(-V_x+V_y)$ coupled to a base of said third bipolar transistor;

a fourth voltage source of $(V_x+(½)V_y)$ coupled to a base of said fourth bipolar transistor;

an input subcircuit for producing said first, second, third, and fourth voltage sources from said first input signal voltage $V_x$ and said second input signal voltage $V_y$; and an output of said multiplier core circuit being defined as a difference between said first output and said second output.

6. A multiplier core circuit as claimed in claim 5, wherein said first, second, third and fourth voltage sources are produced by using voltage dividers each of which is made of at least one resistor.

7. A multiplier core circuit for multiplying a first input signal voltage $V_x$ and a second input signal voltage $V_y$, said circuit comprising:

first, second, third and fourth FETs whose sources are coupled together;

a current source for driving said first to fourth FETs by a common tail current;

drains of said first and second FETs being coupled together to form a first output;

drains of said third and fourth FETs being coupled together to form a second output;

a first voltage source of $(V_x-V_y)$ coupled to a gate of said first FET;

a second voltage source of $2V_x$ coupled to a gate of said second FET;

a third voltage source of $V_x$ coupled to a gate of the third FET;

a fourth voltage source of $(2V_x-V_y)$ coupled to a gate of the fourth FET;

an input subcircuit for producing said first, second, third, and fourth voltage sources from said first input signal voltage $V_x$ and said second input signal voltage $V_y$; and an output signal of the multiplier core circuit being defined as a difference between said first output and said second output.

8. A multiplier core circuit as claimed in claim 7, wherein said first, second, third and fourth voltage sources are produced by using voltage dividers each of which is made of at least one resistor.

9. A multiplier core circuit for multiplying a first input signal voltage $V_x$ and a second input signal voltage $V_y$, said circuit comprising:

first, second, third and fourth FETs whose sources are one of directly grounded and directly applied with a supply voltage;

drains of said first and second FETs being coupled together to form a first output;

drains of said third and fourth FETs being coupled together to form a second output;

a first voltage source of $(V_x-V_y)$ coupled to a gate of said first FET;

a second voltage source of $2V_x$ coupled to a gate of said second FET;

a third voltage source of $V_x$ coupled to a gate of said third FET;

a fourth voltage source of $(2V_x-V_y)$ coupled to a gate of said fourth FET;

an input subcircuit for producing said first, second, third, and fourth voltage sources from said first input signal voltage $V_x$ and said second input signal voltage $V_y$; and an output of said multiplier core circuit being defined as a difference between said first output and said second output.

10. A multiplier core circuit as claimed in claim 9, wherein said first, second, third and fourth voltage sources are produced by using voltage dividers each of which is made of at least one resistor.

11. A multiplier core circuit for multiplying a first input signal voltage $V_x$ and a second input signal voltage $V_y$, said circuit comprising:

first, second, third and fourth bipolar transistors whose emitters are coupled together;

a current source for driving said first to fourth bipolar transistors by a common tail current;

collectors of said first and second transistors being coupled together to form a first output;

collectors of said third and fourth transistors being coupled together to form a second output;

a first voltage source of $(V_x-V_y)$ coupled to a base of said first bipolar transistor;

a second voltage source of $2V_x$ coupled to a base of said second bipolar transistor;

a third voltage source of $V_x$ coupled to a base of said third bipolar transistor;

a fourth voltage source of $(2V_x-V_y)$ coupled to a base of said bipolar fourth transistor;

an input subcircuit for producing said first, second, third, and fourth voltage sources from said first input signal voltage $V_x$ and said second input signal voltage $V_y$; and an output of said multiplier core circuit being defined as a difference between said first output and said second output.

12. A multiplier core circuit as claimed in claim 11, wherein said first, second, third and fourth voltage sources are produced by using voltage dividers each of which is made of at least one resistor.

13. A multiplier core circuit for multiplying a first input signal voltage $V_x$ and a second input signal voltage $V_y$, wherein a, b, and c are positive constants, said circuit comprising:

first, second, third and fourth FETs whose sources are coupled together;

a current source for driving said first to fourth FETs by a common tail current;

drains of said first and second FETs being coupled together to form a first output;

drains of said third and fourth FETs being coupled together to form a second output;

a first voltage source of $(aV_x+bV_y)$ coupled to a gate of said first FET;

a second voltage source of $((a-c)V_x+(b-1/c)V_y)$ coupled to a gate of said second FET;

a third voltage source of $((a-c)V_x+bV_y)$ coupled to a gate of the third FET;

a fourth voltage source of $(aV_x+(b-1/c)V_y)$ coupled to a gate of the fourth FET;

an input subcircuit for producing said first, second, third, and fourth voltage sources from said first input signal voltage $V_x$ and said second input signal voltage $V_y$; and an output of said multiplier core circuit being defined as a difference between said first output and said second output.

14. A multiplier core circuit as claimed in claim 13, wherein said first, second, third and fourth voltage sources are produced by using voltage dividers each of which is made of at least one resistor.

15. A multiplier core circuit as claimed in claim 13, wherein said constants a, b and c satisfy the relationships of $a \geqq c$ and $b \geqq (1/c)$.

16. A multiplier core circuit as claimed in claim 13, wherein a=2, and b=c=1.

17. A multiplier core circuit for multiplying a first input signal voltage $V_x$ and a second input signal voltage $V_y$, wherein a, b, and c are positive constants, said circuit comprising:

first, second, third and fourth FETs whose sources are one of directly grounded and directly applied with a supply voltage;

drains of said first and second FETs being coupled together to form a first output;

drains of said third and fourth FETs being coupled together to form a second output;

a first voltage source of $(aV_x+bV_y)$ coupled to a gate of said first FET;

a second voltage source of $((a-c)V_x+(b-1/c)V_y)$ coupled to a gate of said second FET;

a third voltage source of $((a-c)V_x+bV_y)$ coupled to a gate of said third FET;

a fourth voltage source of $(aV_x+(b-1/c)V_y)$ coupled to a gate of said fourth FET;

an input subcircuit for producing said first, second, third, and fourth voltage sources from said first input signal voltage $V_x$ and said second input signal voltage $V_y$; and an output of said multiplier core circuit being defined as a difference between said first output and said second output.

18. A multiplier core circuit as claimed in claim 17, wherein said first, second, third and fourth voltage sources are produced by using voltage dividers each of which is made of at least one resistor.

19. A multiplier core circuit as claimed in claim 17, wherein said constants a, b and c satisfy the relationships of $a \geqq c$ and $b \geqq (1/c)$.

20. A multiplier core circuit as claimed in claim 17, wherein a=2, and b=c=1.

21. A multiplier core circuit for multiplying a first input signal voltage $V_x$ and a second input signal voltage $V_y$, wherein a, b, and c are positive constants, said circuit comprising:

first, second, third and fourth bipolar transistors whose emitters are coupled together;

a current source for driving said first to fourth transistors by a common tail current;

collectors of said first and second transistors being coupled together to form a first output;

collectors of said third and fourth transistors being coupled together to form a second output;

a first voltage source of $(aV_x+bV_y)$ coupled to a base of said first bipolar transistor;

a second voltage source of $((a-c)V_x+(b-1/c)V_y)$ coupled to a base of said bipolar second transistor;

a third voltage source of $((a-c)V_x+bV_y)$ coupled to a base of said third bipolar transistor;

a fourth voltage source of $(aV_x+(b-1/c)V_y)$ coupled to a base of said fourth bipolar transistor;

an input subcircuit for producing said first, second, third, and fourth voltage sources from said first input signal voltage $V_x$ and said second input signal voltage $V_y$; and an output of said multiplier core circuit being defined as a difference between said first output and said second output.

22. A multiplier core circuit as claimed in claim 21, wherein said first, second, third and fourth voltage sources are produced by using voltage dividers each of which is made of at least one resistor.

23. A multiplier core circuit as claimed in claim 21, wherein said constants a, b and c satisfy the relationships of $a \geqq c$ and $b \geqq (1/c)$.

24. A multiplier core circuit as claimed in claim 21, wherein a=2, and b=c=1.

25. A method for multiplying a first input signal voltage $V_x$ and a second input signal voltage $V_y$ together in a multiplier core circuit, comprising the steps of:

coupling together sources of a first, second, third and fourth FETs;

applying a current source for driving said first to fourth FETs by a common tail current;

coupling together drains of said first and second FETs to form a first output;

coupling together drains of said third and fourth FETs to form a second output;

producing a first voltage source of $(-V_x+(½)V_y)$, a second voltage source of $(V_x+V_y)$ a third voltage source of $(-V_x+V_y)$, and a fourth voltage source of $(V_x+(½)V_y)$ from said first input signal voltage $V_x$ and said second input signal voltage $V_y$ in an input circuit;

coupling said first voltage source of $(-V_x+(½)V_y)$ to a gate of said first FET;

coupling said second voltage source of $(V_x+V_y)$ to a gate of said second FET;

coupling said third voltage source of $(-V_x+V_y)$ to a gate of the third FET;

coupling said fourth voltage source of $(V_x+(½)V_y)$ to a gate of the fourth FET; and generating an output of said multiplier core circuit as a difference between said first output and said second output.

26. A method for multiplying a first input signal voltage $V_x$ and a second input signal voltage $V_y$ together in a multiplier core circuit, comprising the steps of:

coupling together sources of a first, second, third and fourth FETs;

applying a current source for driving said first to fourth FETs by a common tail current;

coupling together drains of said first and second FETs to form a first output;

coupling together drains of said third and fourth FETs to form a second output;

producing a first voltage source of $(V_x-V_y)$ a second voltage source of $2V_x$, a third voltage source of $V_x$, and a fourth voltage source of $(2V_x-V_y)$ from said first input signal voltage $V_x$ and said second input signal voltage $V_y$ in an input circuit;

coupling said first voltage source of $(V_x-V_y)$ to a gate of said first FET;

coupling said second voltage source of $2V_x$ to a gate of said second FET;

coupling said third voltage source of $V_x$ to a gate of the third FET;

coupling said fourth voltage source of $(2V_x-V_y)$ to a gate of the fourth FET; and generating an output of said multiplier core circuit as a difference between said first output and said second output.

27. A method for multiplying a first input signal voltage $V_x$ and a second input signal voltage $V_y$ together in a multiplier core circuit, wherein a, b, and c are positive constants, comprising the steps of:

coupling together sources of a first, second, third and fourth FETs;

applying a current source for driving said first to fourth FETs by a common tail current;

coupling together drains of said first and second FETs to form a first output;

coupling together drains of said third and fourth FETs to form a second output;

producing a first voltage source of $(aV_x+bV_y)$, a second voltage source of $((a-c)V_x+(b-1/c)V_y)$, a third voltage source of $((a-c)\ V_x+bV_y)$, and a fourth voltage source of $(aV_x+(b-1/c)V_y)$ from said first input signal voltage $V_x$ and said second input signal voltage $V_y$ in an input circuit;

coupling said first voltage source of $(aV_x+bV_y)$ to a gate of said first FET;

coupling said second voltage source of $((a-c)V_x+(b-1/c)V_y)$ to a gate of said second FET;

coupling said third voltage source of $((a-c)V_x+bV_y)$ to a gate of the third FET;

coupling said fourth voltage source of $(aV_x+(b-1/c)V_y)$ to a gate of the fourth FET; and generating an output of said multiplier core circuit as a difference between said first output and said second output.

* * * * *

UNITED STATES PATENT AND TRADEMARK OFFICE

CERTIFICATE OF CORRECTION

PATENT NO. : 5,831,468

DATED : November 3, 1998

INVENTOR(S) : Katsuji Kimura

It is certified that error appears in the above-identified patent and that said Letters Patent is hereby corrected as shown below:

Column 15, Line 15: delete "MOSFET5" and insert --MOSFETs--

Column 15, Line 56: delete "MOSFET5" and insert --MOSFETs--

Column 20, Line 59: delete "$V_1+V_4V_2V_3=2b$" and insert -- $V_1+V_4-V_2-V_3=2b$--

Column 23, Line 67: delete "M8e" and insert --M88--

Column 24, Line 1: delete "do" and insert -dc--

Column 24, Line 42: delete "and (57f)" and insert --, (57f) and (57g)--

Signed and Sealed this

Twenty-first Day of September, 1999

Attest:

Q. TODD DICKINSON

*Attesting Officer*

*Acting Commissioner of Patents and Trademarks*